United States Patent
Edwards

(10) Patent No.: US 6,744,877 B1
(45) Date of Patent: Jun. 1, 2004

(54) METHOD AND SYSTEM FOR ENTERPRISE SERVICE BALANCING

(75) Inventor: Thomas J. Edwards, Seattle, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/264,497

(22) Filed: Mar. 8, 1999

(51) Int. Cl.⁷ ............................................. H04M 3/00
(52) U.S. Cl. ........................... 379/265.02; 379/142.04; 379/142.06; 379/265.09; 379/265.12; 379/266.02
(58) Field of Search ................... 379/142.04, 142.06, 379/142.17, 220.01, 221.01, 265.01, 265.02, 265.12, 266.02, 112.09, 142.01, 207.13, 265.09

(56) References Cited

U.S. PATENT DOCUMENTS

| | | | |
|---|---|---|---|
| 4,163,124 A | 7/1979 | Jolissaint | 179/18 D |
| 4,737,983 A | 4/1988 | Frauenthal et al. | 379/221 |
| 4,797,911 A * | 1/1989 | Szlam et al. | 379/88.22 |

(List continued on next page.)

FOREIGN PATENT DOCUMENTS

| | | | |
|---|---|---|---|
| EP | 0 772 335 A2 | 5/1997 | H04M/3/50 |
| GB | 2 290 192 A | 12/1995 | H04M/3/50 |

OTHER PUBLICATIONS

Web Site Printout Entitled "GeoTel Communications Granted Patent for Intelligent Call Routing Technology", www.geotel.com/Patent.htm; [accessed Jul. 3, 1997].
Web Site Printout Entitled "Intelligent CallRouter Call Flow", www.geotel.com [accessed 1998].
Web Site Printout Entitled "The Intelligent CallRouter Product Overview", www.geotel.com/products.htm; [accessed Jul. 3, 1997].
Web Site Printout Entitled "Intelligent CallRouter Product Architecture", www.geotel.com/architec.htm; [accessed Jul. 3, 1997].

*Primary Examiner*—Bing Bui
(74) *Attorney, Agent, or Firm*—Sheridan Ross P.C.

(57) ABSTRACT

A method and system for processing an enterprise's incoming customer communications on the basis of the enterprise's business objectives. An enterprise service balancer distributes work based upon enterprise resources and immediate resource availability. The enterprise service balancer provides an instantaneous best possible service for a customer communication (e.g., a call) by matching the customer communication with the most appropriate available resource in the enterprise, as a whole, in accordance with the enterprise's definition of best service. The enterprise service balancer may refrain from moving media for a customer communication to an identified resource until after determining that the identified resource accepts the customer communication for further processing. The enterprise service balancer looks for an enterprise resource having a specific skills set when the enterprise receives a customer communication requiring the specific skills set. The enterprise service balancer operates in conjunction with enterprise resources as diverse as call center agents, back office agents, and robotic call processing applications. The back office agents, such as technical staff members, represent persons who do not typically handle customer communications. The robotic call processing system may operate in conjunction with an interactive voice response ("IVR") system or other such robotic system appropriate for the communications media. The enterprise service balancer may process customer communications arriving via media such as telephony, e-mail, video kiosk, and an internet.

29 Claims, 13 Drawing Sheets

U.S. PATENT DOCUMENTS

| | | | |
|---|---|---|---|
| 4,894,857 A | * 1/1990 | Szlam et al. | 379/67.1 |
| 5,274,700 A | * 12/1993 | Gechter et al. | 379/211.01 |
| 5,278,898 A | 1/1994 | Cambray et al. | 379/266 |
| 5,335,268 A | 8/1994 | Kelly, Jr. et al. | 379/112 |
| 5,530,744 A | 6/1996 | Charalambous et al. | 379/265 |
| 5,544,232 A | * 8/1996 | Baker et al. | 379/88.25 |
| 5,546,452 A | 8/1996 | Andrews et al. | 379/219 |
| 5,592,542 A | 1/1997 | Honda et al. | 379/265 |
| 5,703,943 A | * 12/1997 | Otto | 379/265.11 |
| 5,754,639 A | 5/1998 | Flockhart et al. | 379/221 |
| 5,757,904 A | 5/1998 | Anderson | 379/265 |
| 5,825,869 A | * 10/1998 | Brooks et al. | 379/265.12 |
| 5,915,012 A | * 6/1999 | Miloslavsky | 379/265.02 |
| 5,937,051 A | * 8/1999 | Hurd et al. | 379/212.01 |
| 5,960,073 A | 9/1999 | Kikinis et al. | 379/265 |
| 5,963,635 A | * 10/1999 | Szlam et al. | 379/309 |
| 5,991,392 A | 11/1999 | Miloslavsky | 379/265 |
| 6,011,844 A | * 1/2000 | Uppaluru et al. | 379/220.01 |
| 6,038,293 A | 3/2000 | McNerney et al. | 379/88.19 |
| 6,041,103 A | * 3/2000 | La Porta et al. | 379/67.1 |
| 6,044,144 A | 3/2000 | Becker et al. | 379/265 |
| 6,215,865 B1 | * 4/2001 | McCalmont | 379/212.01 |
| 6,233,333 B1 | 5/2001 | Dezonmo | 379/266 |
| 6,434,230 B1 | 8/2002 | Gabriel | 379/265.01 |
| 6,480,599 B1 | * 11/2002 | Ainslie et al. | 379/265.02 |
| 6,518,994 B1 | * 2/2003 | Mitzka et al. | 348/14.11 |

* cited by examiner

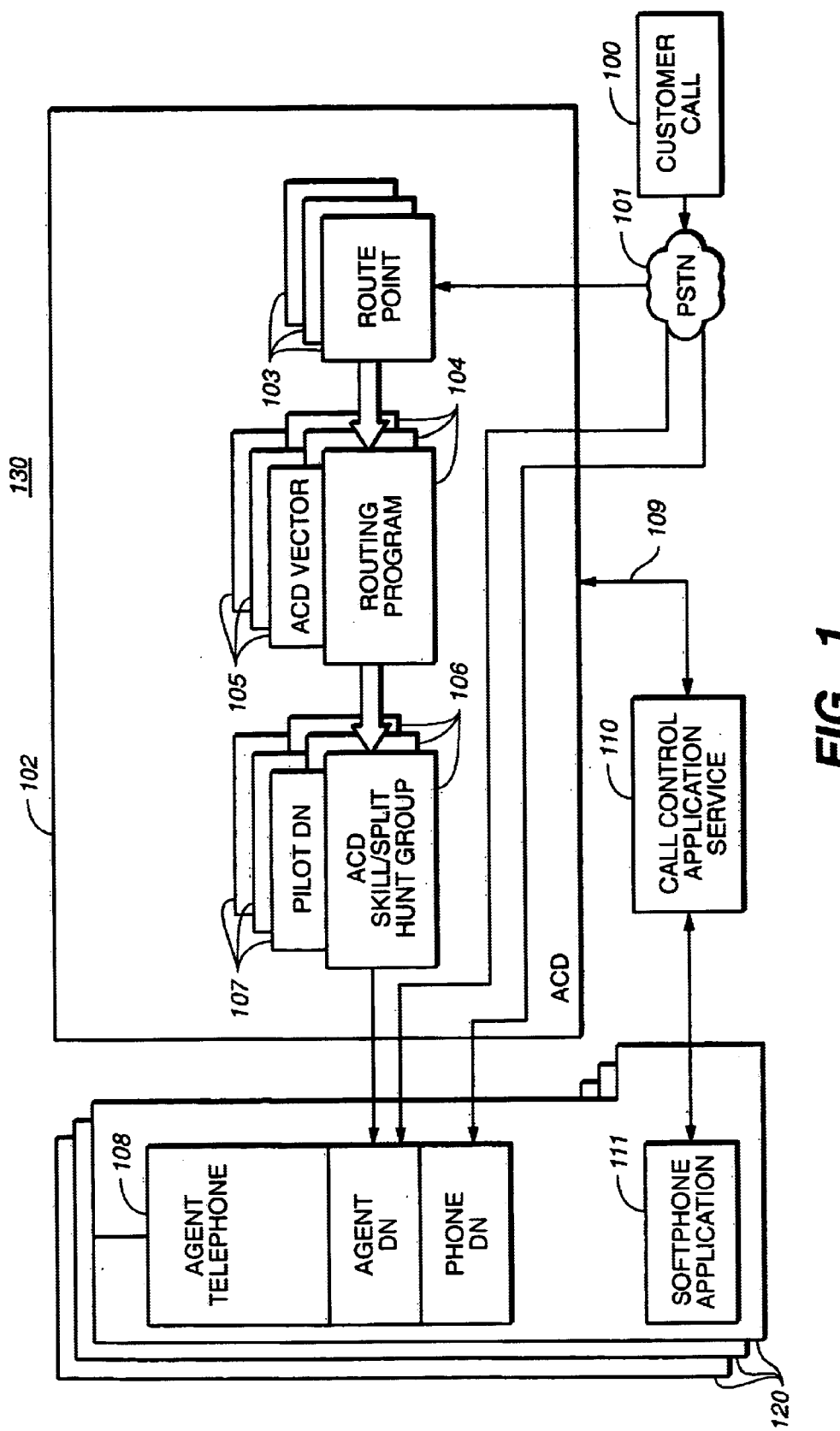
FIG._1
(PRIOR ART)

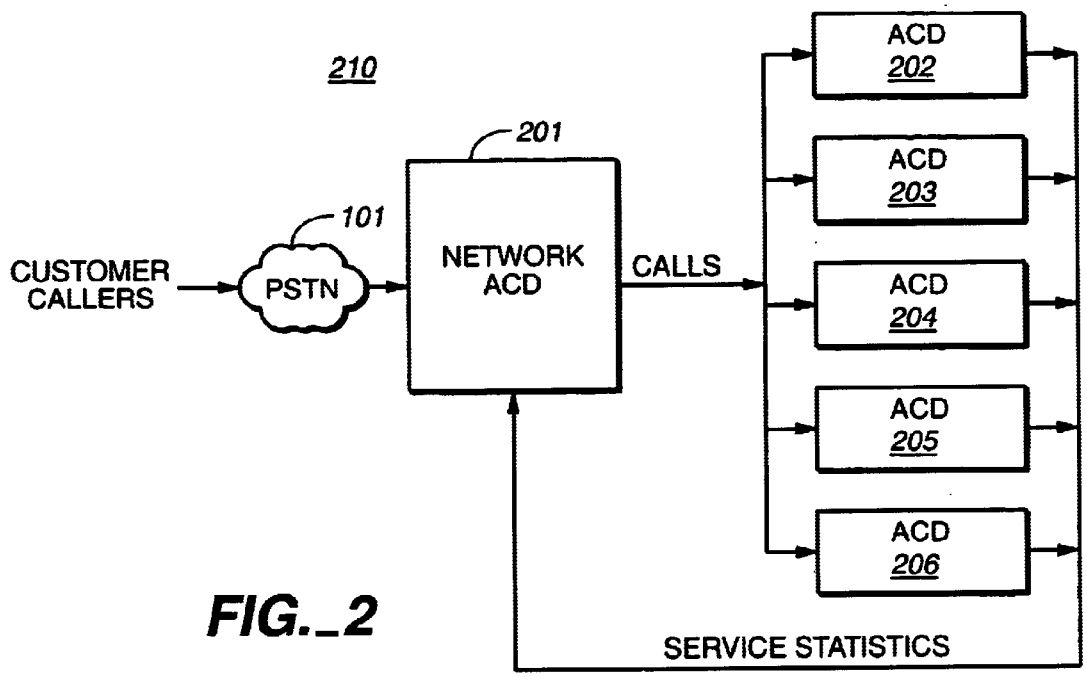
FIG._2
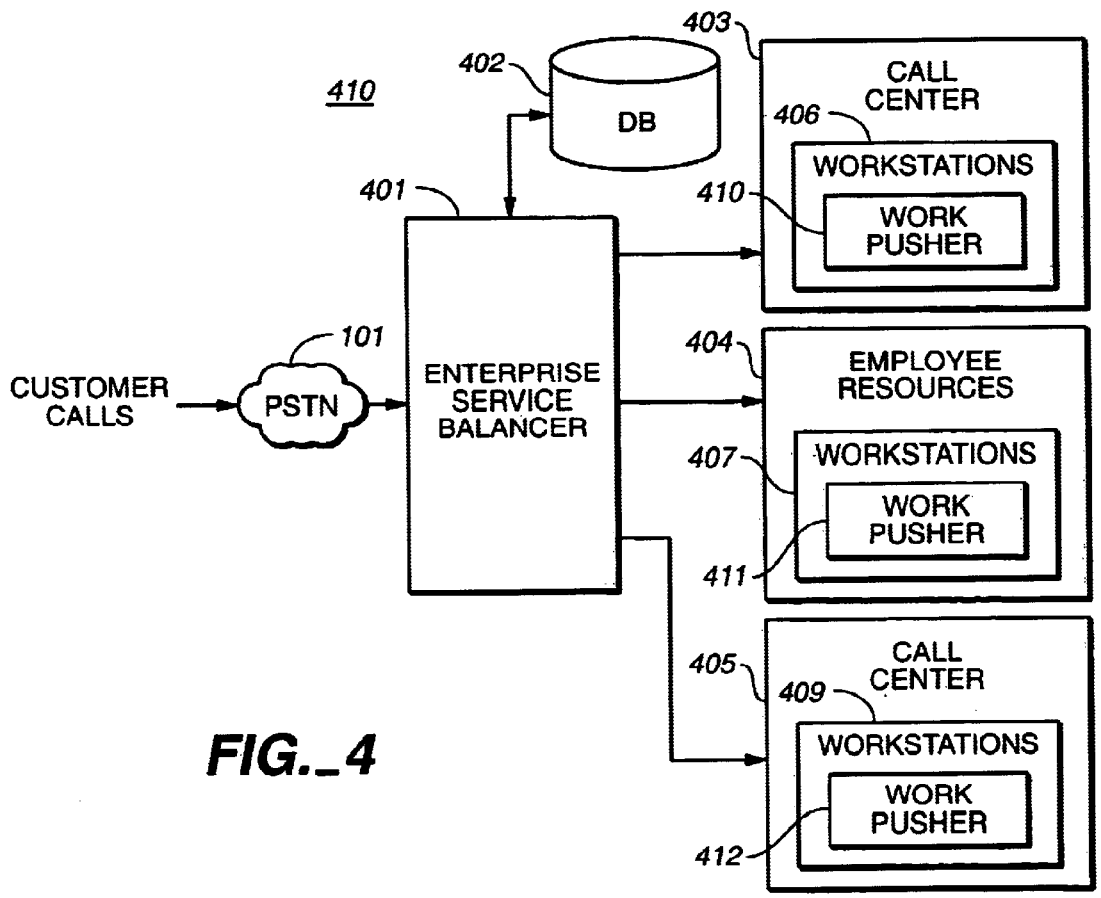
FIG._4

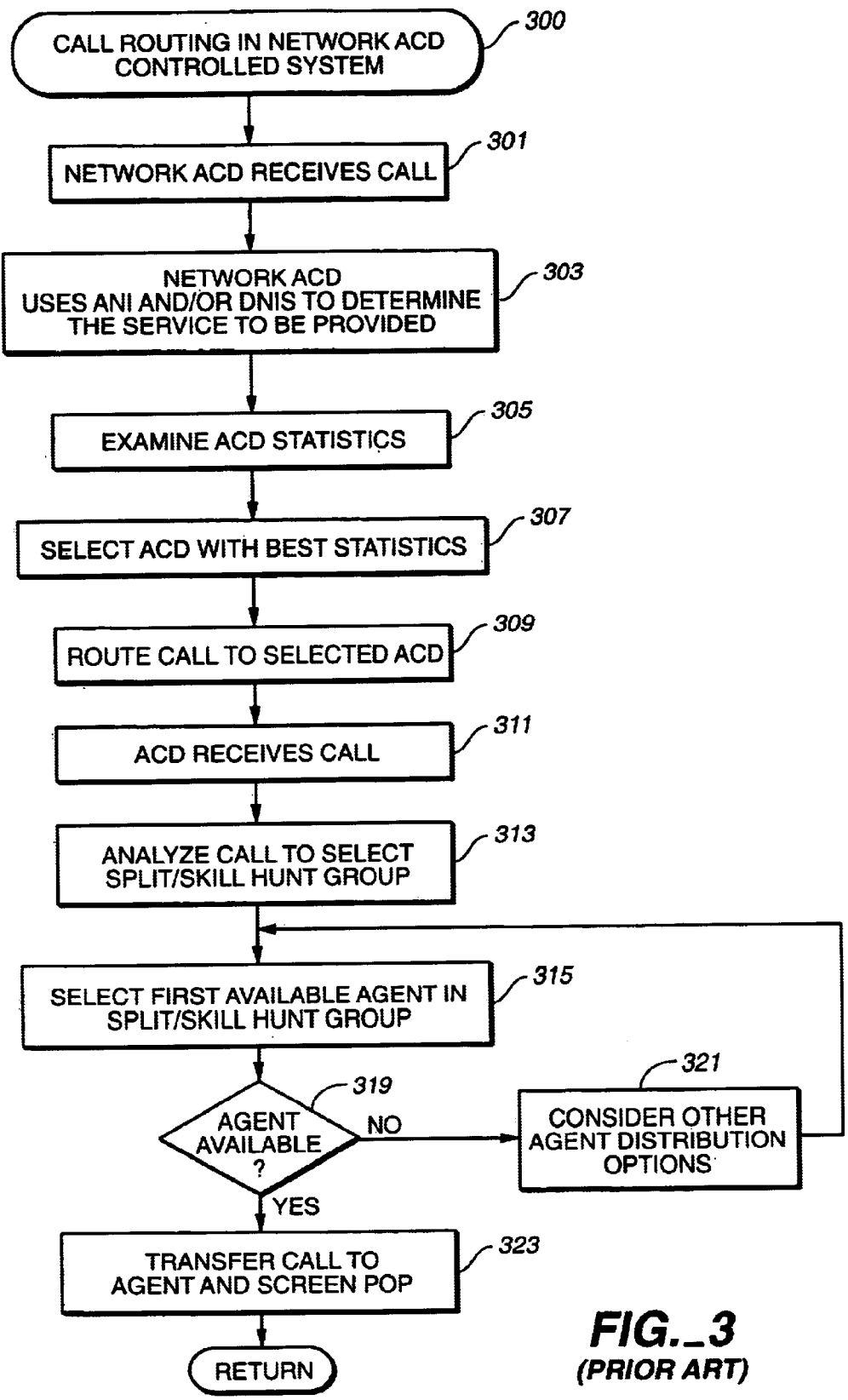
FIG._3 (PRIOR ART)

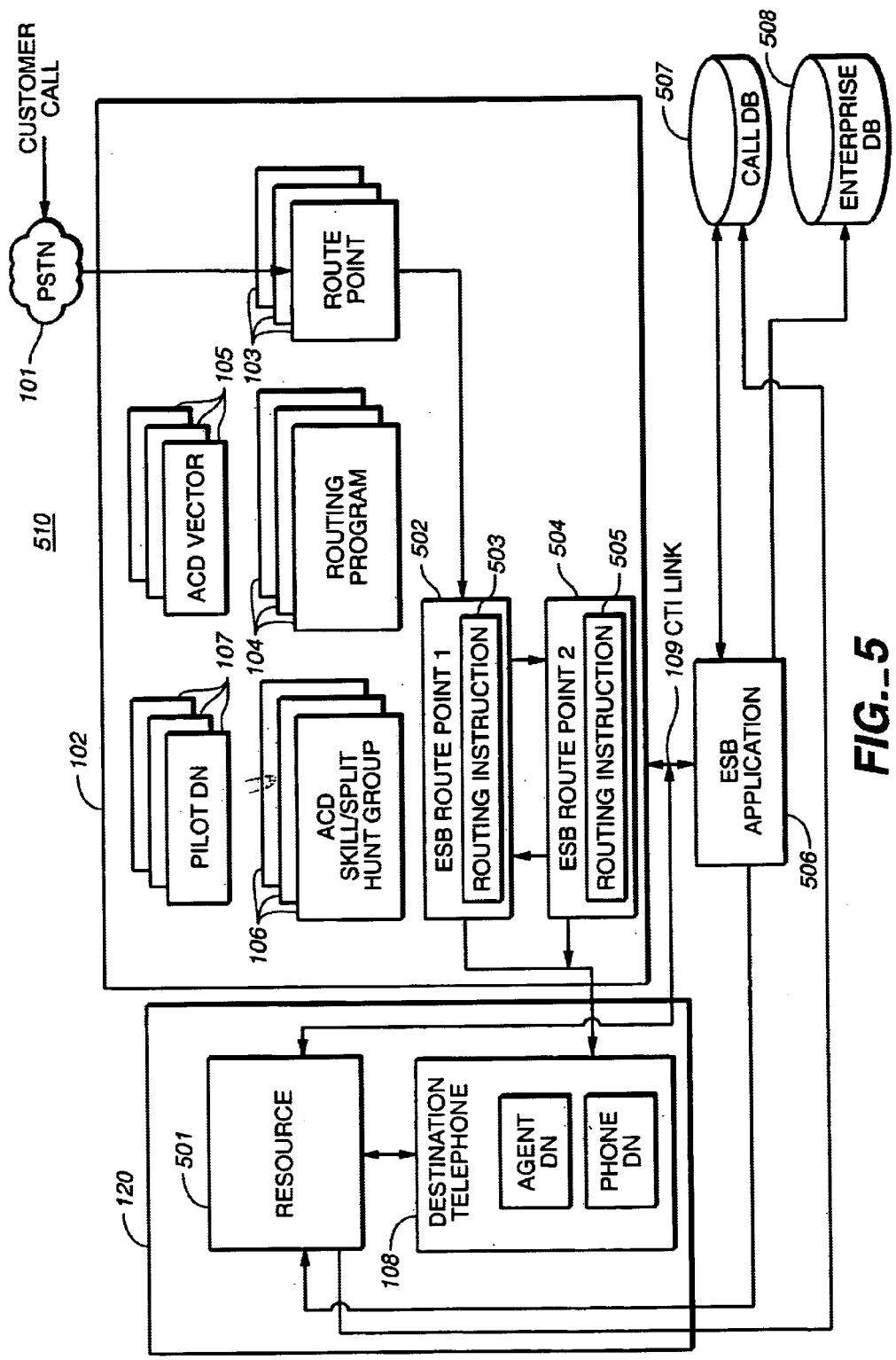
FIG._5

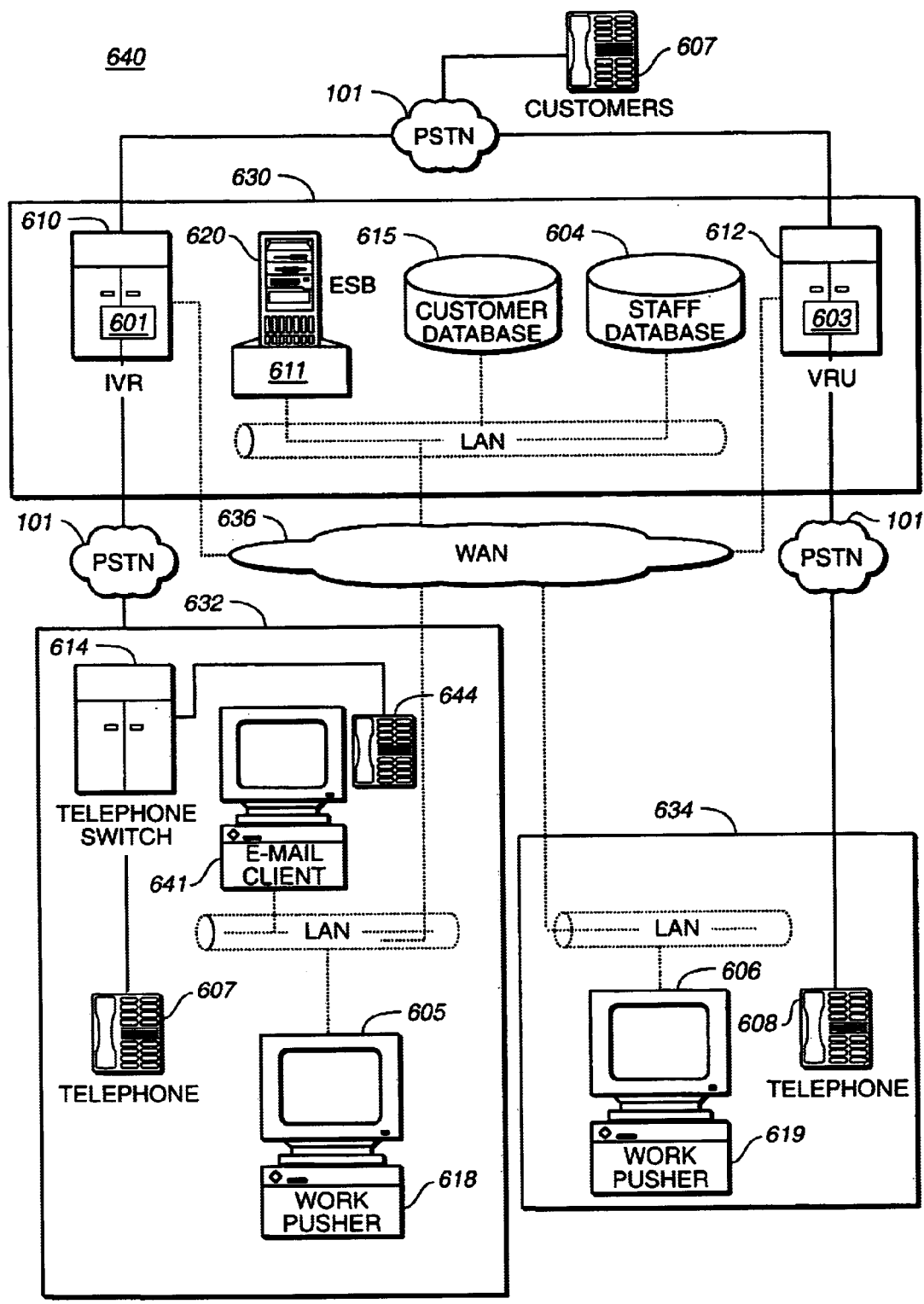
FIG._6

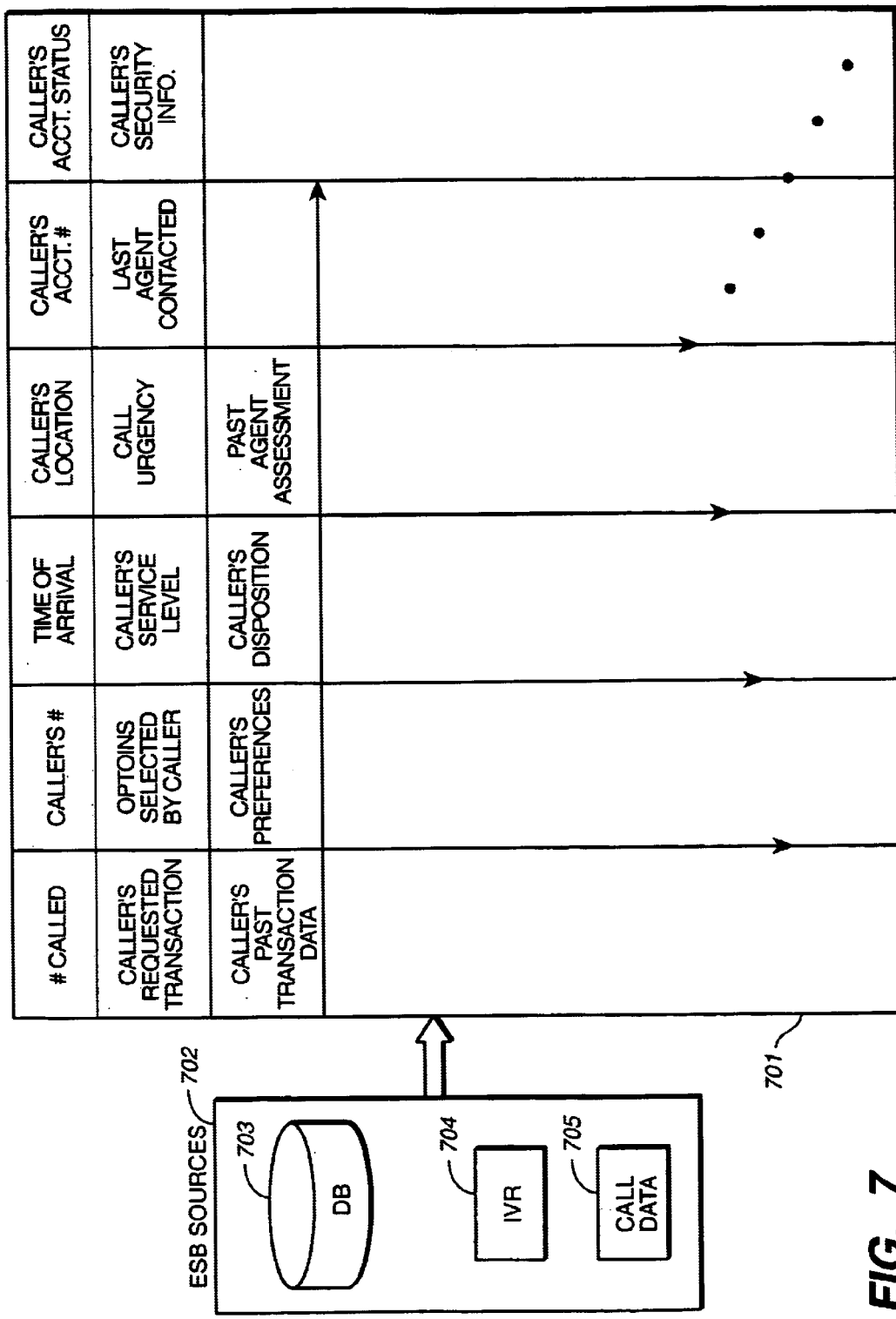
FIG._7

AGENT PROFILE:

QUALIFIED SKILLS: LEVEL: 0-15

OPTIONAL SKILL: LEVEL: 12-14

AGENT ID: 446-92-1436

AGENT DN: 8456

CLIENTS QUALIFIED: 142, 150, 36, 42, 48...

CUSTOMER IDs THIS PERIOD: 882146, 903412, 87453...

WORK PACKET MAX. SATURATION: 3

DIRECT CALL RECEIPT PRIVILEGE: NO

| SKILL | PREFERENCE | SKILL RATING |
|---|---|---|
| LOAN PROCESSING | 8 | 5 |
| ADDRESS CHANGE | 1 | 5 |
| ESCROW ESTABLISHMENT | 3 | 3 |
| BILLING | 0 | 0 |
| FRENCH | 6 | 5 |
| ENGLISH | 5 | 5 |

AGENT OCCUPANCY: 85%

HANDLE TIME FOR EACH SERVICE CLASS OF WORK:
    GOLD: 7 MINUTES,   PLATINUM: 5 MINUTES

BUSY TIME: 1.2 MINUTES

OFF-CALL TIME: 3.5 MINUTES

AGENT AVAILABILITY: AVAILABLE

FIG._8

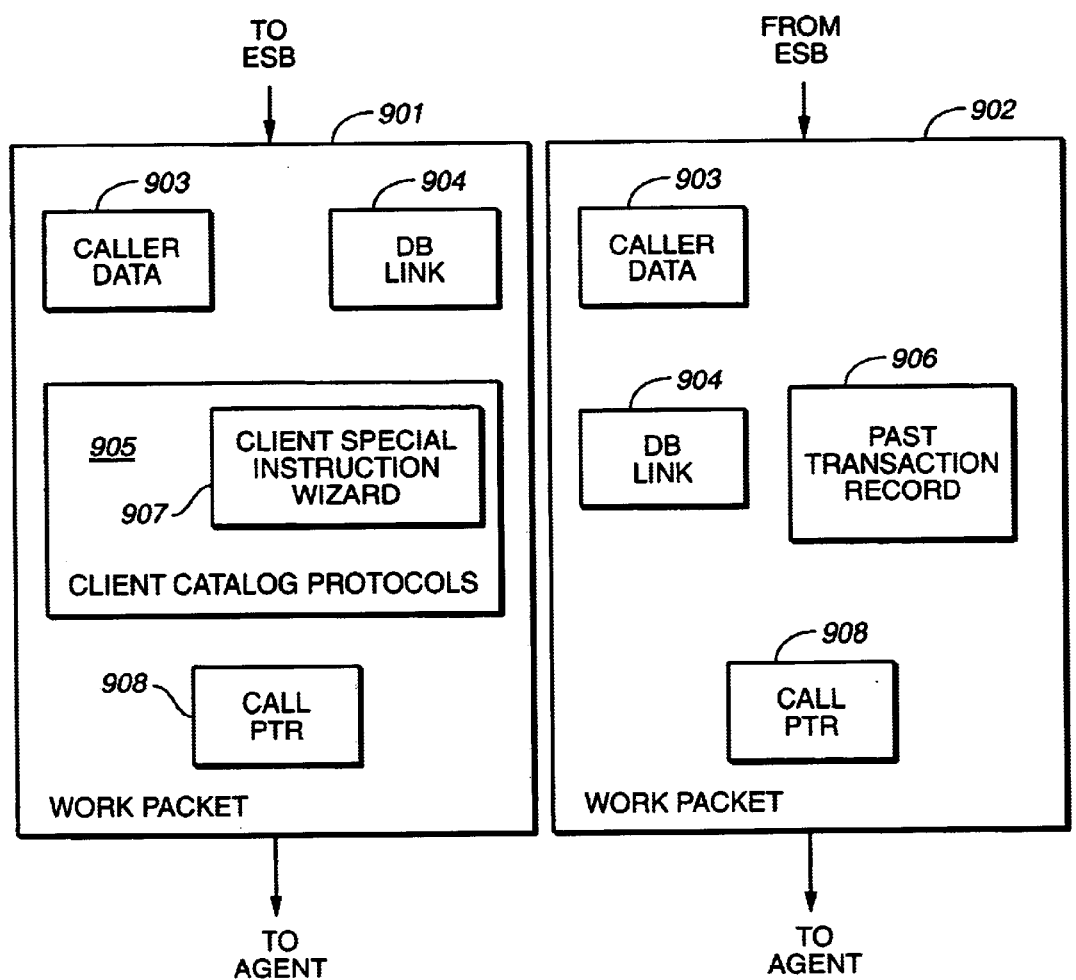
FIG._9

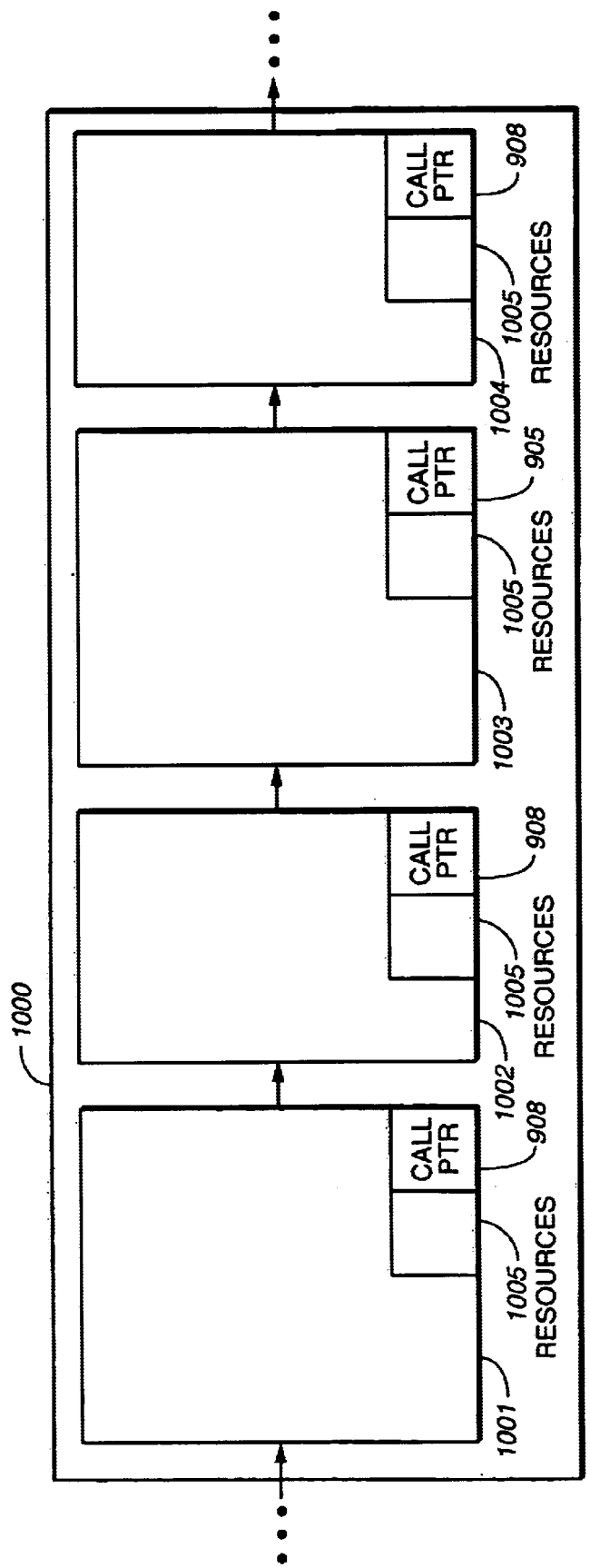
FIG._10

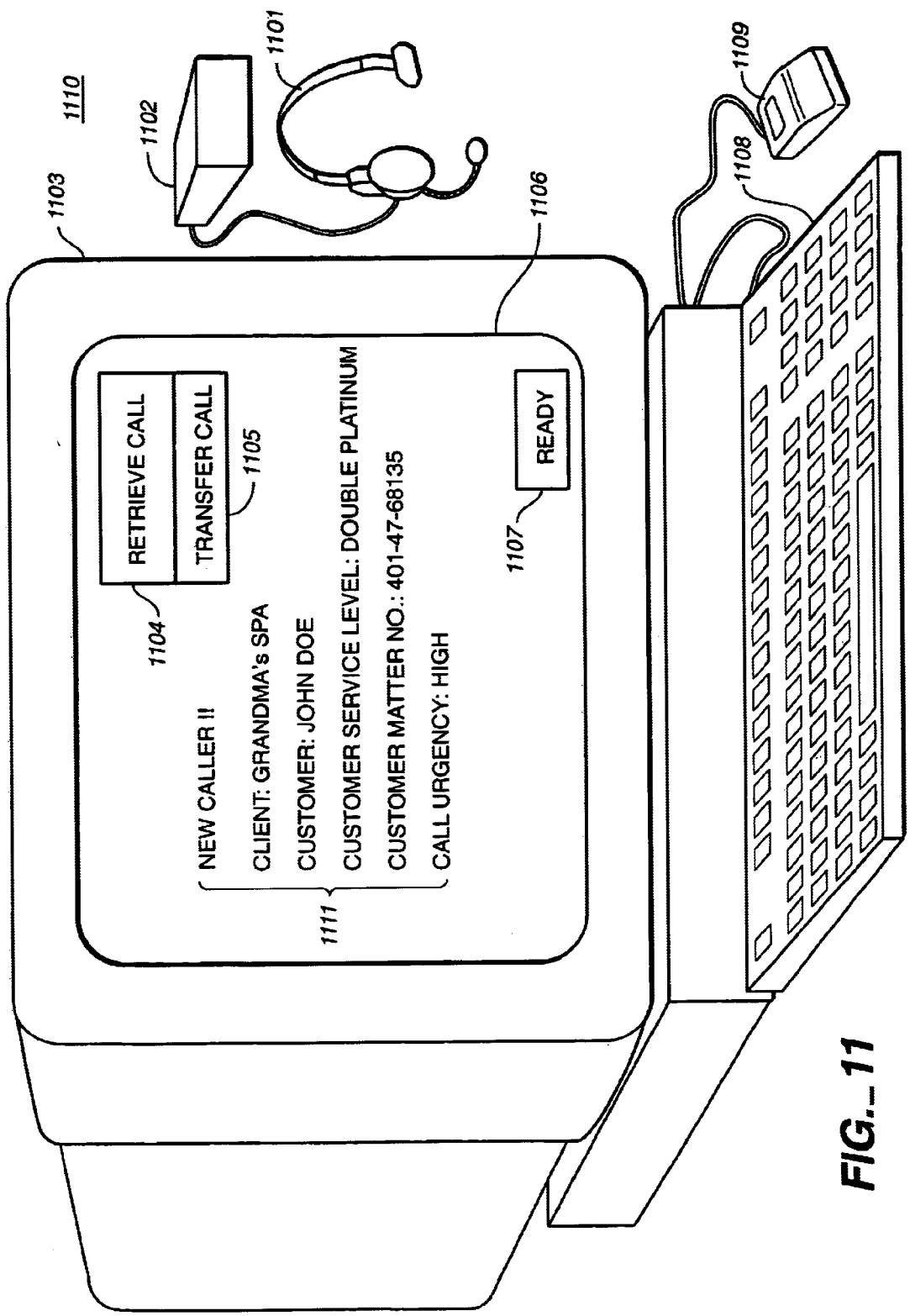
FIG._11

CUSTOMER: JOHN SMITH

CUSTOMER #: 442-59-67845

SERVICE LEVEL: GOLD PLUS

<<CALLER HAS BEEN SECURED>>

CALL ARRIVAL TIME: 8:14 AM

PRESENT TIME: 8:16 AM

CALLER WAIT TIME: 2 MIN. 4 SEC.

CALLER's ADDRESS
1414 CANTON LANE, JENKS, OK

CALLER's PHONE:
918-446-5849

PAYMENT: VISA
4157-46-38-40002

CLIENT: BARNEY's BAGELS
MOTTO: "HAPPY BAGELS TO YOU!"

CALL URGENCY: HIGH

LAST ORDER: 445 BLUEBERRY BAGELS

STATUS: UNDELIVERED

COST: $250.00

AGENT ID: 446

AGENT: FREDDIE FALSTAFF

DATE: NOV. 1, 1998, 8 AM

PAST CALLER DISPOSITION: CONFUSED

CALLER PREFERENCES:
1) PREFERS TO BE CALLED "JOHNNY"
2) ALWAYS WANTS TO KNOW IF ANY SPECIALS
3) PREFERS UNBAKED TO BAKED

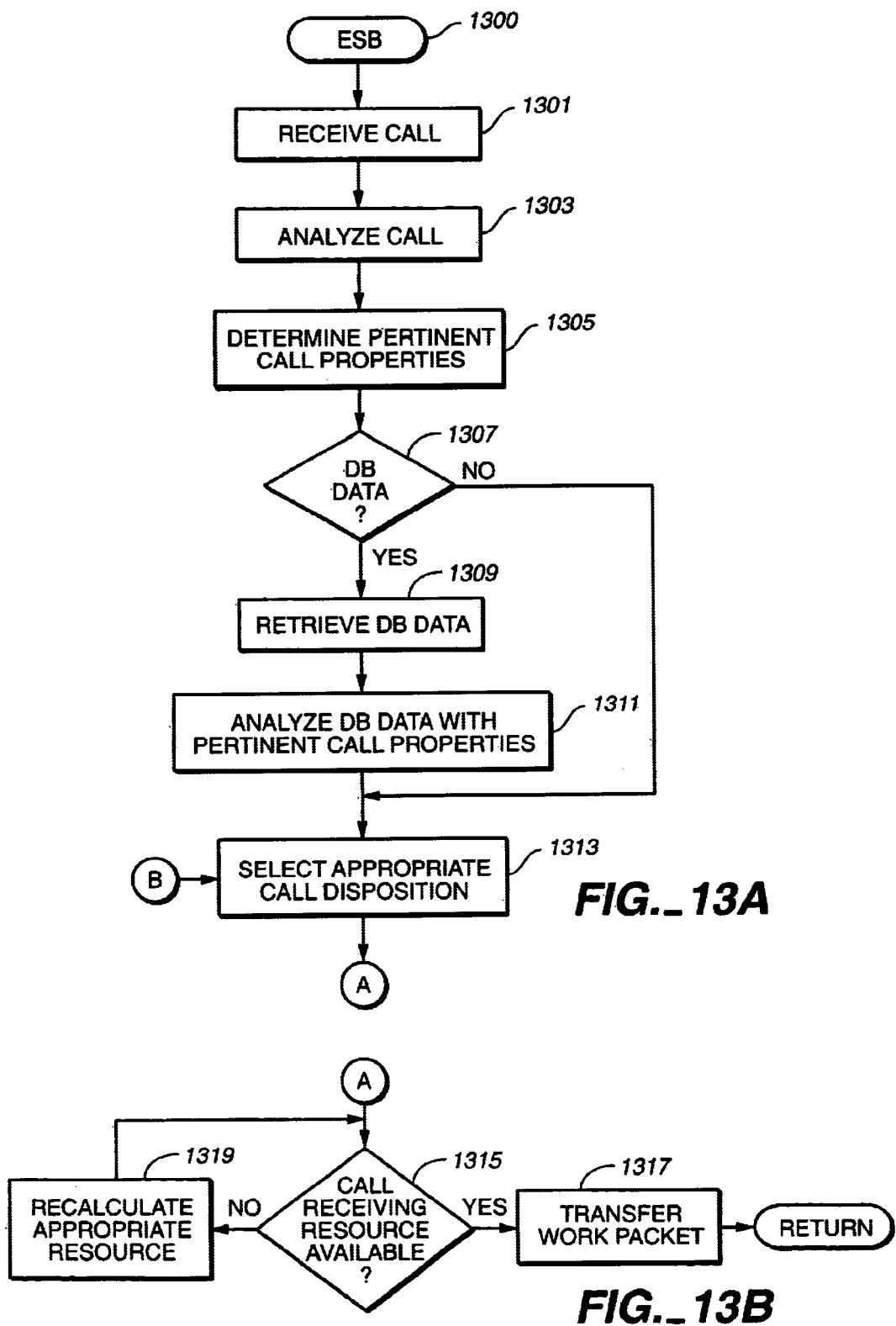
FIG._13A
FIG._13B

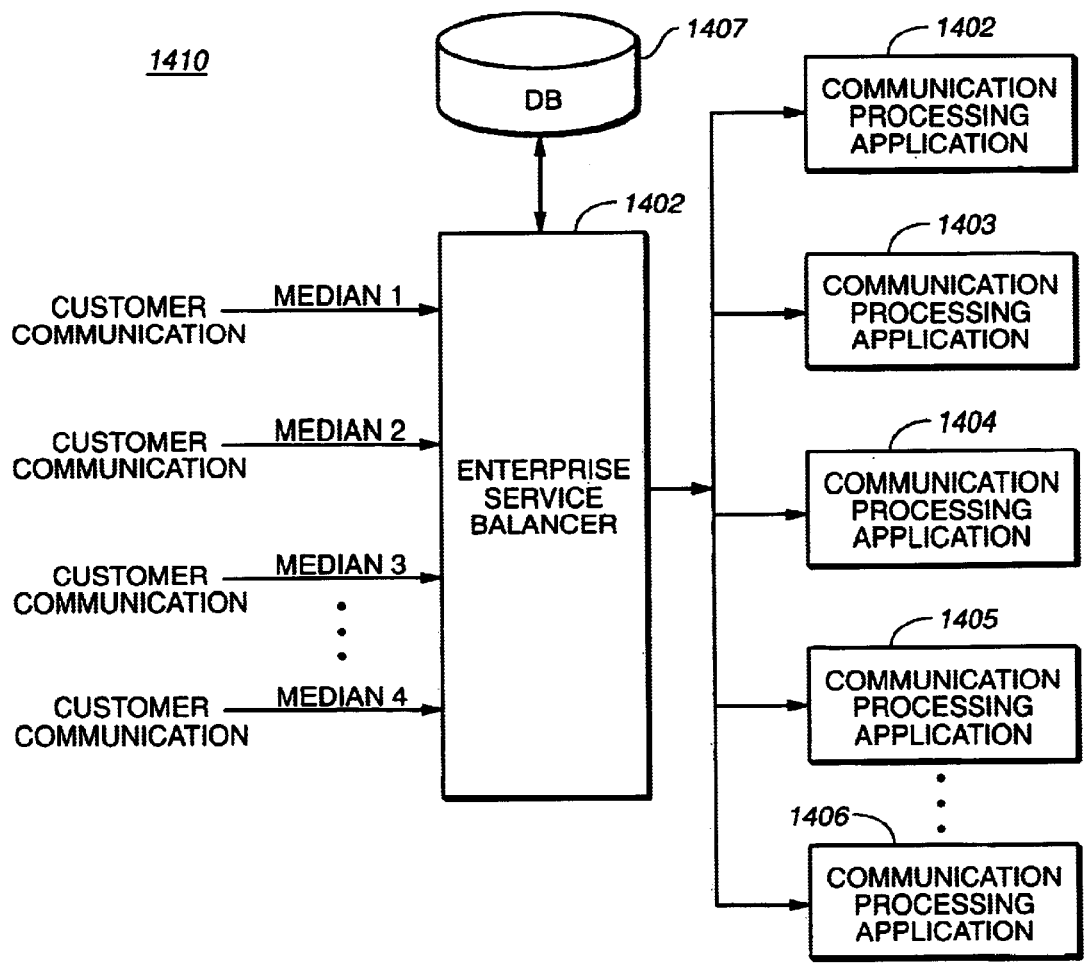
FIG._14

US 6,744,877 B1

METHOD AND SYSTEM FOR ENTERPRISE SERVICE BALANCING

TECHNICAL FIELD

The invention relates generally to the processing and distribution of customer communications within an enterprise and, more particularly, to analyzing and processing each customer communication entering the enterprise to provide communication processing consistent with enterprise business objectives.

BACKGROUND OF THE INVENTION

A business enterprise, or simply "enterprise," may utilize one or more call centers to handle inbound and outbound customer calls. A typical call center includes a number of agents who field inbound telephone calls and place outbound telephone calls. Call center telephone calls frequently have associated data, such as customer information that the agents utilize in processing the calls. The call center's communication system may organize the agents into groups, known as skill/split hunt groups, based on their skills and qualifications.

A conventional call center typically comprises either an automatic call distributor ("ACD") or private branch exchange ("PBX") that receives incoming calls through a public switched telephone network ("PSTN") and routes the calls to a skill/split hunt group, rather than to a specific agent. Agents are associated with these skill/split hunt groups to receive incoming calls. An ACD typically contains a superset of the functions provided by a PBX. The ACD/PBX typically queues incoming calls to one or more skill/split hunt groups with available agents on the basis of statistical information that these skill/split groups satisfy an objective level of service. An objective level of service might be "calls answered on the average in 10 seconds" or "90% of calls are answered in 20 seconds." When multiple agents are available to handle a call, typically they will deliver the call to the agent who has been idle—waiting for a next call the longest period of time. Other criteria for agent selection are also used. The agents typically process customer calls utilizing either specialized telephones, known as ACD/PBX feature phones, that interface with a specific ACD/PBX or utilize software-controlled telephony applications ("softphones") that can coexist with a proprietary ACD/PBX feature phone or can utilize telephone sets not necessarily designed for the call center's particular ACD/PBX. Softphones provide a less expensive means for attaining many of the capabilities of an ACD/PBX feature phone while using only software in combination with a "plain-old-telephone set" ("POTS").

Call center agents typically have access to customer data to facilitate call processing. For example, a call center agent may utilize a graphical user interface ("GUI") program that provides calling scripts and access to a customer database. In a softphone environment, the GUI program may also control telephony functions. While interacting with a caller, the agent uses hot keys or an electronic mouse to select telephony functions on a workstation screen. A hot key is a keystroke or combination of keystrokes that sends a command to a computing system that processes the agent's commands.

FIG. 1 illustrates a conventional softphone-configured call center 130. In the softphone call center 130, an ACD 102 interfaces between the customer telephone call 100 and an agent telephone 108 in an agent workstation 120. The softphone call center 130 will comprise multiple agent workstations 120 having multiple agent telephones 108. Customers typically place telephone calls to the agent telephones 108 via the PSTN 101. When a customer telephone call 100 arrives at the ACD 102, an ACD route point 103 receives the call. The ACD 102 routes incoming calls through the ACD route point 103 which typically comprises a phone number (e.g., a directory number ("DN")) in the numbering plan of the ACD 102 that works in conjunction with a routing program 104 that provides a call-handling instructions script. An ACD vector 105, typically a computer program, controls the routing program 104 to enable customized call processing specifications in the ACD 102. The routing program 104 tells the ACD's call processing software how to treat the customer call 100. The routing program 104 typically includes at least one announcement and at least one queue statement. The ACD vector 105 and the routing program 104 may be combined in some conventional ACDs. The queue statement directs the call to a specific ACD skill/split hunt group 106 based on the assumption that the skill/hunt group 106 provides the best service to the incoming caller. The ACD skill/split hunt group 106 has a single phone number, a Pilot Directory Number ("Pilot DN") 107, that subsequently directs the client telephone call to one of the available agent telephones 108 within the particular ACD skill/split hunt group 106. The ACD skill/split hunt group 106 may select an agent telephone 108 if this is the only agent available to take a call or on the basis of an agent being idle the longest if multiple agents are available to take a call. As shown in FIG. 1, the ACD 102 may have multiple route points 103, multiple routing programs 104, multiple ACD vectors 105, and multiple ACD skill/split hunt groups 106. Each ACD skill/split hunt group 106 will usually include multiple agent workstations 120.

A call control application server 110 communicates with the ACD 102 through a computer-telephony integration ("CTI") link 109. The call control application server 110 comprises a standard computing system, such as a personal computer ("PC"), and a CTI server application that processes calling information for an agent via a softphone application 111 at the agent workstation 120. Each agent typically has a terminal that provides a GUI to the softphone application 111. The softphone application 111 emulates the button functions of a conventional ACD/PBX feature phone. The call control application server 110 synchronizes the softphone application 111 with the ACD 102 by sending event messages to the softphone application 111 pertaining to the agent's telephone 108. The call control application server 110 services telephony commands from the softphone application 111 to provide the agent with a softphone. In a typical configuration, each agent has access to an individual copy of the softphone application 111 at his or her workstation 108. The softphone application 111 servicing each agent workstation 108 may be run from the call control application server 110, for example, in an internet browser-based implementation. The combination of the agent workstation 120 utilizing a POTS such as the telephone 108 and the softphone application 111 provides the agent with the features available on more expensive ACD/PBX feature phones.

The agent telephones 108 typically receive calls directed to either of two numbers. The first number is the telephone number for the telephone instrument itself, known as the Phone Directory Number ("Phone DN"). The second number is a telephone number corresponding to the agent, known as an Agent Directory Number ("Agent DN"). The Agent DN follows an individual call center agent. Thus, an agent may switch from one agent workstation 120 to another agent workstation 120 and still retain the same Agent DN. The Agent DN constitutes a personal telephone number for the agent and returns a fast busy signal if the agent is not logged into the ACD 102 or a busy signal when the agent is on another call.

In a softphone-equipped call center, such as the call center shown in FIG. 1, a customer call 100 may reach an individual agent in several different ways. The customer call 100 may reach the agent through the ACD route point 103. This method of calling does not necessarily reach a specific agent but instead reaches any available agent in the ACD skill/split hunt group 106. This method provides general calling but is unsuitable for reaching a specific agent. If no agent is available in the ACD skill/split hunt group 106 when a call arrives, the ACD 102 simply queues the call for processing by the next available agent. In some call centers, the ACD 102 may direct a light to flash at the agent workstation 120 when a call arrives through an Agent DN. A call may also reach an agent by being directed through the PSTN 101 to the Agent DN or the agent telephone's Phone DN.

When an ACD agent is available to take another call, the ACD 102 concurrently sends an event message via a CTI middleware product to the agent's workstation 120 that causes an application in the workstation to present customer data about the call to the agent. The event message contains user data associated with the phone call that is supplied by the ACD or via external data sources accessed by the CTI middleware. For example, the event message user data may contain the calling party's translated automatic number identification ("ANI") (who is calling) and the dialed number identification service ("DNIS") (why they are calling). The workstation application interprets the event user data to provide a data presentation to the agent. This data presentation is known as a "screen pop" as the agent's workstation monitor suddenly displays the customer information. The screen pop should arrive slightly ahead of, or concurrent with, the arrival of the call at the agent's telephone 108, which typically includes an audio headset. Sometimes the call arrives at an agent's headset before the screen pop, compelling the agent to begin with a general greeting without knowing to whom he is speaking. Such errors prevent the agent from quickly assessing how to treat the call.

A call center may also have one or more robotic call-handling applications that process all or part of a customer call. A robotic call-handling application's requirements resemble those of a softphone application. The primary difference is that the softphone manages calls arriving at a specific Phone DN while a robotic call-handling application manages calls arriving at a specific route point 103, also known as a Route Point DN. A robotic call-handling application may communicate with both the route point 103, the ACD skill/split hunt group 106, and the Agent DN and the Phone DN at the agent's workstation 120. Some robotic applications may receive information from the customer calls 100 and may, in some instances, handle a call in a manner much like that of a call center agent. For example, a robotic call-handling application may utilize an interactive voice response ("IVR") system in the processing of a customer call. As robotic technologies grow more sophisticated, robotic applications may even begin replacing many, or in some instances all call center agents. In many instances, robotic applications require capabilities beyond those required by human call center agents, such as handling many more calls than a human agent.

An enterprise may have more than one call center, and the call centers may have a variety of configurations and provide different processing capabilities. Enterprises having multiple call centers typically want to unify the disparate pieces of their call processing capabilities in order to provide consistent and balanced call processing. Balancing the utilization of geographically distributed resources in various call centers against the demand for such resources is known as "load balancing." For example, if call center A has the capacity to handle 100 calls per minute and currently there are no idle agents with many calls waiting to be serviced, while call center B has the capacity to handle 200 calls per minute but has many idle agents, load balancing would balance the incoming calls across both call centers to take advantage of the idle agents in call center B to provide better service to the customers calling into call center A.

Load balancing is especially appropriate in customer-facing call centers that handle inbound phone calls and whose agents receive calls from an ACD/PBX, such as the ACD 102 shown in FIG. 1. One type of software system that performs load balancing across all such call centers at the PSTN network level is conventionally known as a "Network ACD." Another type of software system that performs load balancing across such call centers at the customer premise equipment ("CPE") ACD level is conventionally known as an "ACD with a load balancing option," although sometimes such CPE ACD implementations are also referred to as a "Network ACD." A Network ACD may comprise a collection of CPE ACDs as well as an ACD that resides in the telephone network that feeds a collection of like or disparate CPE ACDs. An exemplary CPE ACD is the Lucent Definity ACD. Typically, the like kind CPE ACDs will have a Load Balancing software feature package, sometimes referred to as a "Network ACD" option. A conventional Network ACD that operates at the PSTN network level is the Geotel Intelligent CallRouter®. For example, in an enterprise call environment, load balancing may mean that calls entering the enterprise's Network ACD's queues are distributed across multiple call centers in such a manner that the load (call volume) at each call center is commensurate with the capability of the ACD resources at each call center to service calls in a timely manner.

FIG. 2 illustrates a conventional load balancing scheme provided by a Network ACD operating at the PSTN network level. A load balancing system 210 comprises a Network ACD 201 and ACDs 202–206. The ACDs 202–206 may be located in one or more call centers, and the ACDs 202–206 may be CPE ACDs. Customer calls reach the load balancing system 210 through the PSTN 101. The ACDs 202–206 provide statistical information regarding utilization of their call processing capabilities. The Network ACD 201 examines the statistical information provided by the ACDs 202–206 to select an ACD to receive a customer call. Thus, the Network ACD distributes calls to the ACDs 202–206 while the ACDs 202–206 return service statistics to the Network ACD 201. The Network ACD 201 selects an ACD to receive a customer call solely upon metrics related to remaining or non-utilized call handling capacity in the ACDs 202–206.

The load balancing system 210 may utilize as its load balancing metric the current service level achieved in each of the ACDs 202–206. Some conventional load balancing systems utilize even cruder metrics. An example of a service level is the average speed to answer ("ASA"), or the average time that a call waits in queue before being directed to an agent. One of the principles underlying most conventional load balancing systems is that a larger ACD service team is more efficient than several smaller service teams. Accordingly, the load balancing system 210 provides the appearance of a virtual service team across physically separate locations.

ACD manufacturers implement load balancing using a variety of schemes. In an enterprise consisting of multiple, geographically dispersed call centers, load balancing may be accomplished by having a Network ACD examine the expected service level to be achieved at each call center and then move the call to the "best" call center to meet expected service objectives. The load balancing system typically assesses the "best" call center in less than 500 msec, i.e., a value determined by the telephone network providers as a required determinant of allowing a third party application (the Network ACD 201) to route a call. For calls not routed by the Network ACD 201 in less than 500 msec, the telephone network provider will distribute the call on the basis of default programming. Moving the call into the ACD of a particular call center (e.g., the ACD 206) places further processing of the call under the control of the ACD and not the Network ACD 201. The ACD will eventually distribute the call to an agent having telephony equipment controlled by the ACD. Accordingly, once a customer call is moved to a specific ACD, the limitations of a small agent pool re-appear as the cost of moving the call back to the Network ACD 201 may be too expensive. Some Network ACDs can move a call back up to the telephone network and redistribute the call, but such processing is expensive and is typically performed on a per call basis.

Each ACD 202–206 in the load balancing system 210 provides statistics regarding the actual service achieved (e.g., the ASA) to the Network ACD 201 in order to allow the Network ACD 201 to perform load balancing. The Network ACD 201 does not typically know which agent received a specific call. Thus, the Network ACD 201 does not directly know the actual service provided. For that matter, no piece of equipment in the load balancing system 210 knows the actual level of service provided by the enterprise in processing customer calls.

A collection of like-manufacturer CPE ACDs may effect call routing via a multi-site ACD load balancing software package. However, even a multi-site ACD software package eventually moves calls to a queue on a CPE ACD for distribution to an agent with the expectation that the calls residing in that particular queue (or queues) will provide the best possible service to the calling customer.

An enterprise may utilize a Centrex system in addition to or instead of using CPE ACDs. In a Centrex system, the local telephone company provides the enterprise with customer calling telephone services from its offices. Even a Centrex system performs load balancing as discussed above. While the Network ACD and one or more CPE ACDs may be the same piece of equipment in a Centrex system, a conventional Centrex system nevertheless utilizes a Network ACD software package that controls call routing in the manner described above. Thus, even a Centrex system performs load balancing for an enterprise on the basis of balancing a load rather than on meeting the enterprise's service objectives. An exemplary Centrex Network ACD package is Lucent's TOPMS which distributes calls base on percent capacity to the underlying CPE ACDs.

FIG. 3 is a flowchart depicting call routing in a conventional Network ACD load balancing system. A Network ACD receives a call (step 301). The Network ACD uses the ANI and DNIS to determine the service to be provided via a database lookup against a database containing routing information (step 303). The Network ACD examines statistics for all of the ACDs operating under the load balancing scheme (step 305) that can service this call. For example, if the incoming call is to customer service, there may be 15 ACDs to which calls can be directed, but only 10 handle customer service requests. Based upon the ACD statistics, the Network ACD selects an ACD for the call based on the ACD having the most appropriate statistics (step 307). As previously discussed, the most appropriate statistics will typically be the ACD having the best service level. The Network ACD then transfers the call to the selected ACD (step 309).

The ACD receives the call sent to it from the Network ACD (step 311). The ACD analyzes the call to select an appropriate split/skill hunt group (step 313). The ACD then selects an available agent in the split/skill hunt group based upon whether an agent is presently available or is the longest idle agent (step 315). If no agent is presently available (step 319), then the ACD may send the call to another split/hunt group (step 321) before routing the call back through the agent selection process (step 315). As the result of considering other agent distribution options (step 321), the ACD may determine that other agents can be considered in order to meet service objectives. For example, calls for Platinum customers are not being answered by Platinum customer agents to meet an ASA service objective of 10 seconds, therefore after waiting 2 seconds with no agent from the pool of Platinum customer agents available, both Platinum customer agents and Gold customer agents will be considered acceptable to answer Platinum customer calls. If an agent is available (step 319), then the ACD transfers the call to the agent while simultaneously sending a CTI event to external server based "screen pop" software that a call is about to be delivered to a specific agent's phone. This external software populates data associated with the call and then executes a "screen pop" instruction (step 323) to an application at the agent's desktop. The desktop application receives the data associated with this call along with CTI call event notification and processes the data to provide a "screen pop." The agent then processes the call according to the enterprise business directives.

As described above, the conventional procedure for routing customer calls in an enterprise environment has been based upon balancing the load among the various components that comprise the enterprise's call-handling capability, e.g., the ACDs. While the conventional process may be adequate for balancing the load among the enterprise's various call-handling components, the conventional procedure does little in the way of accomplishing an enterprise's business objectives with regard to its customers and to its resources, such as its call center agents. In addition, the conventional procedure does not address customer communications arriving from communication media other than telephones.

SUMMARY OF THE INVENTION

The invention provides a method and system for processing an enterprise's incoming customer communications on the basis of the enterprise's business objectives. Embodiments of the invention deliver services to an enterprise's customers across all lines of the enterprise's business and treats customers in a consistent manner independent of their entry point into the enterprise's business communication facilities. Embodiments of the invention tie together physically separate business communication centers, including "back office" sites not normally associated with processing customer communications.

Embodiments of the invention provide an enterprise service balancer that distributes work based upon enterprise service objectives, enterprise resources and immediate resource availability. The enterprise service balancer provides an instantaneous best possible service for a customer communication (e.g., a call) by matching the customer communication with the most appropriate resource in the enterprise, as a whole, in accordance with the enterprise's definition of best service. Unless a customer communication is directed to a specific agent, embodiments of the enterprise service balancer refrain from moving a customer communication until a resource(s) has identified itself as available. The enterprise service balancer may provide a virtual call center that unites the enterprise's various telephony elements, such as physically separate call centers, to provide a unified call-handling capacity for the enterprise. Agents, or agent applications, may make themselves available for taking a higher priority work, such as a call over the work currently performed, according to an embodiment of the invention. Therefore, identifying oneself as "available" may be "available for specific types of work which can interrupt current work." For example, an agent may be working on a billing adjustment work type but will make himself available for taking a Platinum Customer phone call billing related work type.

Embodiments of the enterprise service balancer processes calls on the basis of specific customer and agent characteristics. The enterprise service balancer further accommodates an enterprise's various definitions of the appropriate resource by referencing a resource's skills set. When the enterprise receives a call from a customer that requires a certain skills set, an enterprise service balancer processing calls according to the definition of "appropriate resource" looks for an available agent in the enterprise who has that skills set.

Embodiments of the enterprise service balancer operate in conjunction with enterprise resources as diverse as call center agents, back office agents, and robotic call processing applications. The back office agents, such as technical staff members, represent persons who do not typically handle inbound customer communications. The robotic call processing applications may operate in conjunction with an interactive voice response ("IVR") system. Embodiments of the enterprise service balancer may receive and process customer communications such as telephony calls, e-mail, video kiosk, and the Internet.

BRIEF DESCRIPTION OF THE DRAWINGS

An embodiment of the invention will be described below relative to the following figures. Note that similar elements and steps in the figures have the same reference number.

FIG. 1 illustrates a conventional softphone-configured call center.

FIG. 2 illustrates a conventional load balancing scheme provided is by a Network ACD operating at the public switched telephone network ("PSTN") level.

FIG. 3 is a flowchart depicting call routing in a conventional Network ACD load balancing system.

FIG. 4 illustrates an enterprise service balancing system 410, according to an embodiment of the invention.

FIG. 5 illustrates a call center 510 that has been configured to operate in conjunction with an enterprise service balancing application, according to an embodiment of the invention.

FIG. 6 illustrates a call center 640 that provides enterprise service balancing without requiring utilization of an ACD.

FIG. 7 illustrates exemplary ESB selection criteria 701 that provide data for enabling an embodiment of the enterprise service balancer 401 to determine the precise enterprise resource to receive a call.

FIG. 8 illustrates a representative ESB agent table 800 that contains the type of data that an enterprise may wish to collect regarding its call center agents and then reference when selecting an appropriate resource for a call.

FIG. 9 provides further details regarding workpackets transferred to enterprise resources.

FIG. 10 illustrates the linking of workpackets in a call parking facility utilized by the enterprise service balancer while attempting to find an appropriate resource to process the call represented by the workpacket, according to an embodiment of the invention.

FIG. 11 illustrates an exemplary agent workstation 1110 for processing workpackets, according to an embodiment of the invention.

FIG. 12 illustrates additional information that may be retrieved in an exemplary workpacket 1200 processed by an enterprise resource.

FIGS. 13A and 13B comprise a flowchart 1300 illustrating the processing of a call in an enterprise service balancing system 410 utilizing an enterprise service balancer 401, according to an embodiment of the invention.

FIG. 14 illustrates an exemplary enterprise service balancing system 1410 that processes customer communications arriving from a variety of media, according to an embodiment of the invention.

DETAILED DESCRIPTION OF THE INVENTION

Embodiments of the invention provide a method and system for processing an enterprise's customer communications on the basis of the enterprise's business objectives, known as enterprise service balancing, rather than solely upon aggregate statistical measures pertaining to the enterprise's automatic call distributors ("ACDs") or private branch exchanges ("PBXs").

Enterprise service balancing ties together physically separate business communication centers, including "back office" sites not normally associated with processing customer calls. Back office sites may include employees not normally associated with call center operations, such as the enterprise's technical staff, enterprise branch locations, enterprise partners and affiliates, and even other enterprise customers. Enterprise service balancing delivers services to customers across all lines of an enterprise's business and treats customers in a consistent manner independent of their entry point into the enterprise's business communication facilities.

In contrast to enterprise service balancing, conventional Network ACDs focus upon agent capacity statistics and/or service achieved statistics for individual customer premise equipment ("CPE") ACDs and do not allow an enterprise to process calls based upon specific customer and agent characteristics. For example, Network ACDs cannot process calls on the basis of an individual agent's skills. A Network ACD's limitations arise both from moving calls to queues not controlled by the Network ACD, such as a queue controlled by a CPE ACD, and from having no real control over the service provided by the CPE ACD once it receives a call.

Enterprise service balancing enables the processing of customer calls according to business objectives by the appropriate resource, such as an agent, regardless of the resource's location. Enterprise service balancing accommodates an enterprise's various definitions of the appropriate resource by referencing a resource's skills set, e.g., process loans and interact with platinum-level customers. An enterprise service balancing system processing calls under this definition of "appropriate resource" looks for an agent who handles platinum-level customers and loan inquiries when the enterprise receives a call from a platinum-level customer regarding a loan. In other circumstances, the appropriate resource may simply be a specific agent, e.g., a customer call to the agent who just completed processing his loan regarding a specific issue associated with the loan.

Embodiments of the enterprise service balancing system provide a virtual call center comprised of the enterprise's various telephony elements, such as physically separate call centers, by linking the enterprise's telephony elements together in such a manner so as to provide a unified call-handling capacity for the enterprise. A virtual call center escapes the rigid design of conventional call centers by providing a more amorphous and flexible design than previously possible. Embodiments of the invention provide an enterprise service balancer that distributes work in a deterministic manner based upon resource skills and immediate availability. The enterprise service balancer provides the "instantaneous" best possible service for a customer request (e.g., a call) by matching the request with the most appropriate resource in the enterprise for processing the customer request in accordance with the enterprise's appropriate "best service" definition. Embodiments of the enterprise service balancer define "instantaneous" as the moment that a resource is available to work on the next work item.

Embodiments of the enterprise service balancer refrain from moving a call until after identifying an available resource in the enterprise as a whole who can best handle the call. Furthermore, the resource may not necessarily be a call center agent. The resource may be a back office agent, such as a technical staff member, who normally does not handle inbound phone calls. The resource may further comprise a robotic call processing system having a skills set capable of processing the customer's call. The robotic call processing system may operate in conjunction with an interactive voice response ("IVR") system.

In the preferred embodiment, the enterprise service balancer provides service on a call-by-call basis (or customer call-by-customer call basis) based upon a resource (e.g., an agent) that has just come available rather than selecting a resource by moving calls to a queue associated with only a portion of the enterprise's call-handling capabilities (e.g., a queue associated with a CPE ACD). When a resource comes available to take a next work item (e.g., a call), the enterprise service balancer selects the best customer call from all calls available in the enterprise that meets this resource's skills and that meets enterprise service objectives. Even in the event that a call is meant for a specific resource, such as a specific agent, the enterprise service balancer may have the agent take another call instead because the other call better meets the overall enterprise service objectives.

For a call requiring a specific set of skills, the enterprise service balancer sends the call to the first resource (e.g., an agent) having the necessary skills set who comes available and for whom the call is the best work for the resource to perform at that moment. The call is sent to this resource when the resource requests the call from the enterprise service balancer by providing its telephone set address (e.g., a Direct Inward Dialing ("DID") number) to the enterprise service balancer. The enterprise service balancer holds the call at its point of arrival into the enterprise and waits (e.g., parks the call) until moving it to a specific resource by simply transferring the call to the destination resource's telephone set address using conventional PBX technology. Conventional PBX technology can be via a computer-telephony integration ("CTI"), via an external device (e.g., an IVR), or other available means. Thus, the enterprise service balancer may move a call directly to a selected resource and bypass the inflexible processing normally performed by a CPE ACD.

FIG. 4 illustrates an enterprise service balancing system 410, according to an embodiment of the invention. The enterprise service balancing system 410 comprises an enterprise service balancer 401, a database 402, a call center 403, employee resources 404, and another call center 405. The call centers 403, 405 and the employee resources 404 and may each respectively include workstations 406–409. An exemplary enterprise service balancing system, according to the invention, may comprise additional call centers and employee resources beyond those depicted in FIG. 4.

The call centers 403, 405 may comprise call centers utilizing ACD/PBXs, call centers equipped without ACDs, and any facility that receives incoming and/or places outgoing calls under the direction of an agent, whether human or robotic. The principal requirement for distribution of calls is that an agent have a unique address representing the agent's telephony device where when an external party dials this address, the agent's telephony device can be connected either over the Public Switched Telephone Network ("PSTN") or a private network. Of course, the agent's telephony device may comprise a standard telephone set, a head set device, and even a telephony card installed in a computing device, such as a personal computer ("PC"). The employee resources 404 represent those portions of the enterprise that are not normally represented in call centers, e.g., back office employees. For example, various specialized activities, such as the enterprise's technical staff, may be represented by the employee resources 404. These employees may not have addresses directly accessible from the PSTN using a simple phone number, however, in this case they can be accessed by equipment such as a PBX auto-attendant for which the supplied address to the enterprise service balancer would be the auto-attendant number on the PBX followed by the specific employee extension (e.g., "425-445-4545 ext. 2379"). This is an example of a mix of PSTN and private network addressing. The call centers 403, 405 may comprise facilities whose services are provided to the enterprise under a contract (e.g., via a Centrex service) where the agents would all be accessible via addresses accessible via the PSTN The enterprise service balancer 401 receives calls from customers via the PSTN 101, analyzes each call to determine the best possible resource within the enterprise service balancing system 410 to receive the call, then makes the call retrievable by the resource once it becomes available. Unlike a Network ACD, the enterprise service balancer 401 may not necessarily receive calls directly from the PSTN 101. For example, the enterprise service balancer 401 may actually wrap around each of the elements within the enterprise service balancing system 410, such as the call center 403. Thus, the enterprise service balancer 401 may be integrated into conventional ACD/PBX equipment. In such an embodiment, the call center 403 directly receives a customer call from the PSTN 101, parks the call, and then requests the enterprise service balancer 401 to select an appropriate resource to process the call in accordance with enterprise-wide objectives.

The enterprise service balancer 401 achieves resource-specificity in meeting service objectives across the entire enterprise service balancing system 410 by utilizing an enterprise workflow system to create a work item for each call as it arrives at a call center, according to a preferred embodiment of the invention. A workflow system both captures and moves information regarding a business transaction (e.g., a customer call) through a work process, ensuring that each enterprise resource can access the information items required to perform its portion of a transaction. Workflow systems may also provide a context for performing work, allowing resources to concentrate on the work at hand, rather than on the process itself. Workflow software, such as that utilized in the enterprise service balancing system 410, improves the efficiency of both mission-critical and ad-hoc business processes. Such improvements should reduce costs, enhance quality, provide faster turnaround, and improve customer satisfaction. A workflow system is not limited to conventional workflow systems, such as primarily developed for document centric work. A workflow system can be any of a myriad system implementations that allows agents to be associated with the processing of work items in a proscribed manner. A proscribed manner may be a process description of a set of process steps for which human agents are associated with some steps and for which robotic agents are associated with some other steps, where at each step agents may interact with the work item The enterprise service balancer 401 processes calls as work items known as "workpackets." A workpacket is a container for data elements that represents a transaction in progress. For example, in a customer service process, a workpacket may contain information related to a customer service transaction, such as a billing adjustment. The workpacket for this transaction may include data such as the identification of the customer associated with this transaction, past history of the business interactions with this customer, a classification of this customer based on the relationship with the customer (e.g., Platinum Status), business rules on how agents should handle this transaction, pointers to documents relative to this transaction (e.g., a pointer to a previously received letter, a pointer to the customer's last billing statement), and if the transaction is currently active, then the workpacket may contain a pointer to the media over which the current transaction is occurring (e.g., a phone call). A workpacket may represent a transaction in progress but not currently being worked on by someone (e.g., waiting for a supervisor signature), or a workpacket may be opened by an agent for processing, or a workpacket may have just been created based on a customer interaction for the customer service example. A workpacket is an example of a New Work Item for which an agent is to perform work. According to a preferred embodiment, for a customer interacting over a telephone, then each workpacket contains a pointer to a respective call being held somewhere within the enterprise service balancing system 410, such as in the call center 403. For example, a call may be parked at an ACD routing control point in an ACD within the call center 403. Of course, other calls may be parked at other ACD routing control points in other ACDs within other call centers or other similar equipment, with all of these call centers linked together by the enterprise service balancer 401. The enterprise service balancer 401 provides for the creation and manipulation of the items comprising the workpackets, the creation and management of agent attributes, the definition and management of service levels, and the distribution of the workpackets.

The enterprise service balancer 401 adds each new workpacket for a newly arrived call to a worklist of workpackets. The worklist essentially amounts to a workpacket parking lot, comprising workpackets waiting for processing by an enterprise resource, such as an agent. The enterprise service balancer 401 provides the workpacket with attributes about the customer call from other applications, such as database queries or IVR interactions. IVR inquiries may be performed by a network IVR or a customer premise equipment ("CPE") IVR associated with a CPE ACD. The enterprise service balancer 401, or other pertinent equipment, still queues the call either at the IVR or the ACD routing control point until it is directed to a selected resource. The enterprise service balancer 401 ultimately determines that the workpacket is ready for distribution to the specific resource that can process the workpacket. In some embodiments of the invention, elements of the workpackets may also represent data from other types of media with which the enterprise may interact, such as processing live video connections with customers, e-mail messages, and internet communications. Accordingly, the invention is not limited to processing only incoming calls through conventional telephony devices.

The enterprise service balancer 401 may utilize the database 402 in directing each incoming call to the appropriate resource within the enterprise service balancing system 410, whether to an agent in a call center or to an appropriate back office employee resource. The enterprise service balancer 401 analyzes each incoming call to determine its pertinent characteristics. During its analysis, the enterprise service balancer 401 may retrieve pertinent data stored in the database 402. In addition, the enterprise service balancer 401 may query the incoming call to determine additional characteristics. The querying of the incoming call may include intrinsic characteristics determined from the call itself (such as those provided by Caller ID and by analysis of the number called by the caller) and may also include characteristics provided by interaction with the caller (such as through a numeric telephone keypad or through an IVR). The enterprise service balancer 401 may additionally examine information regarding resources, such as agents, within the call centers 403, 405 and characteristics regarding employees within the employee resources 404.

Once the enterprise service balancer 401 has determined an appropriate resource to process the call, then the enterprise service balancer 401 may transfer the call to the selected resource. According to a preferred embodiment, the enterprise service balancer 401 sends the workpacket, or other indicia of the call's contents, to the selected resource. In the preferred embodiment of the invention, the enterprise service balancer opens the workpacket to obtain the parking location of the call (the workpacket pointer to the media, in this case a parked phone call) and then delivers the call to the selected resource's telephony device using that resource's network address. In other embodiments, the selected resource may review the workpacket before speaking with the caller. The selected resource may choose not to process the call and send an indication to the enterprise service balancer 401 that another resource should be found to process the call. In still other embodiments of the invention, the enterprise service balancer 401 transfers the workpacket to the resource along with the transferred call. In some embodiments, the enterprise service balancer 401 may even operate in a configurable dual mode, e.g., allowing call refusal during low periods of incoming call traffic but disabling call refusal during peak call traffic periods.

In delivering the media (e.g., a call) to an agent, the preferred embodiment of the enterprise service balancer 401 has a work pusher distributed on each resource's workstation. For example, the call center 403 includes the workstations 406, at least some of which have a work pusher 410. Similarly, the workstations 407 on the employee resources 404 may also include a work pusher 411 and the call center's 405 workstations 409 may also include a work pusher 412. The work pusher 410 selects a workpacket based on meeting objectives established dynamically by the enterprise service balancer 401, pushes the workpacket to its workstation 406, opens the workpacket, and then requests the component parking the particular call to send the call to the workstation's associated telephony device. In another embodiment, the enterprise service balancer 401 itself contains a work pusher that identifies the work for one or more resources. In both embodiments, the work pusher pushes the workpacket to a workstation, and when the workpacket is opened, the pointer to the call directs the call from the park location to the agent's telephony device. The workstation knows (e.g., the workstation 406) its telephony device address and provides this address to the enterprise service balancer 401. The workstation 406 may either provide the address to the work pusher when the work pusher 410 is distributed to the workstation 406 or the address may be stored in the database 402 when enterprise service balancer 401 contains the work pusher. The workpacket pushed to the workstation causes call delivery to the associated telephony device. In comparison, in a conventional Network ACD delivery of the phone call to the telephony device causes the data associated with a call to be opened. As should be readily apparent to an ordinary artisan, the enterprise service balancer 401 may be distributed. For example, the enterprise service balancer 401 may be distributed across each of several call centers, such as the call centers 403 and 405, and/or other centers containing employee resources, such as the employee resources 404. An apparatus that transfers calls may also reside within the work pusher 410 rather than in the enterprise service balancer 401, according to an embodiment of the invention.

The enterprise service balancer 401 processes calls on the basis of an enterprise-wide customer attribute description that may be stored in the database 402. The customer attribute description provides a configurable template of the characteristics that should be collected regarding the call to determine its best disposition within the enterprise service balancing system 410. The customer attribute description includes those attributes helpful in selecting a call center agent as well as those attributes helpful in selecting an employee resource. Characteristics within the customer attribute description may be ranked in order of importance, and combinations of characteristics may also be ranked in order of importance. For example, a call's requirement for an agent fluent in French at a high level of proficiency may be classified as more important than the agent's loan processing skills. By capturing the characteristics and relationships among the characteristics of importance to the enterprise, the enterprise service balancer 401 may process each received call in a manner that best achieves the enterprise's overall goals.

The enterprise service balancer 401 may also be configured to utilize call attributes, such as the cost of moving a call, in determining the best resource to meet the enterprise's objectives. Considering transportation costs when making routing decisions can reduce operating costs. Let's assume that there are two agents of equal skill, but one is on the East Coast and the other is on the West Coast. Furthermore, let's assume that it is less expensive to move an East Coast call to an East Coast agent. A call arrives at the enterprise service balancing system 410 on the East Coast. To achieve the desired service level, the call will be moved to the East Coast agent if the workpacket attributes used by the enterprise service balancer 401 favor using East Coast agents for East Coast Calls even though the West Coast agent has equal skill to make the call. In other words, unless other call attributes outweigh the cost of transferring the call, the call will remain on the East Coast.

FIG. 5 illustrates a call center 510 that has been configured to operate in conjunction with an enterprise service balancing application, according to an embodiment of the invention. Because the enterprise service balancing system distributes the call and not an ACD, a call-receiving resource does not need to be an ACD agent but can be a back-office agent who has telephone connectivity to a PBX that is interconnected with the ACD. This is another distinct advantage of an enterprise service balancing system over a conventional Network ACD. The call center 510 may accommodate an embodiment of an enterprise service balancing system without requiring either a hardware modification of the ACD 102 or the addition of any new equipment inside the ACD 102.

A client call arrives at the ACD 102 and is received in the route point 103. The route point 103 directs the call as instructed by the routing program 104. The routing program 104 directs the call to a first enterprise service balancing ("ESB") route point 502. A routing instruction 503 associated with the first ESB route point 502 transfers the call after a configurable time period to a second ESB route point 504. The second ESB route point 504 contains a routing instruction 505 that in turn redirects the call, after a configurable time period, back to the first ESB route point 502. The call continues to be routed back and forth between the two ESB route points until the call is otherwise disposed. Exemplary methods and systems for parking calls using route points in an ACD/PBX are disclosed in U.S. patent application Ser. No. 09/060,038, "Multiple Call Handling in a Call Center," filed on Apr. 13, 1998, assigned to the Mosaix Corporation, and which is incorporated herein by reference.

An ESB application 506 receives notification of the call's arrival through the CTI link 109. The ESB application 506 may have even directed the transfer of the call into the first ESB route point 502 in some embodiments of the invention. In any event, the ESB application 506 makes a relevant notation regarding the call in a call database 507. The ESB application 506 continues to receive updates regarding the location of the call and stores such information in the call database 507.

The ESB application 506 on call arrival creates a workpacket for the call and inserts into the workpacket pertinent information relative to the call, such as the call location, the automatic number identification ("ANr") (who is calling), the dialed number identification service ("DNIS") (why they are calling), customer entered digits, IVR interaction data, business rules for handling the transaction, pointers to stored information such as documents, and past transaction histories.

The ESB application 506 analyzes the call and consults an enterprise database 508 to determine a proper resource 501 to receive the call presently parked in one of the first and second ESB route points 502, 504. The ESB application 506 tags the call with this set of resources. The tag may be a list of resources in an ESB having a centralized work pusher or may be simply the required resource attributes in an ESB with distributed work pushers. Once the ESB application 506 has selected a set of resources 120 for the call, or has simply associated the resource attributes required to service the call, then the ESB application 506 waits for one of the resources 120 to become available. When one of the resources 120 becomes (or is) available, then the ESB application 506 forwards the workpacket to a specific one of the resources 501. As previously described, the workpacket contains a pointer to the call in the call database 507. The resource 501 may review the workpacket and decide whether to accept the workpacket for processing or return it to the ESB application 506, according to some embodiments of the invention. The resource 501 is typically associated with an agent workstation 120 having a capability for receiving the workpacket. The resource 501 may be any capability accessible by the enterprise that can satisfy the needs of the specific call being processed by the enterprise. For example, the resource 501 may be an ordinary telephone used by the engineer who designed a particular component of an enterprise product if this particular engineer is the best enterprise resource for processing a specific call received by the enterprise.

If the resource 501 elects to process the workpacket, or is required to process the workpacket, the resource 501 may review the workpacket's contents before connecting with the call. Once the resource 501 decides to connect with the call, then the resource 501 requests the call by sending its telephony device address to the enterprise service balancer component that has parked the call, (e.g., controlling the call at either the first ESB route point 502 or the second ESB route point 504). The ESB parking component sends a query using the workpacket call pointer to the call database 507 to determine whether the call is presently located in the first ESB route point 502 or the second ESB route point 504. Using the telephony address provided by the resource 501, the parking component then formulates an appropriate call transfer instruction, using the CTI link 109 or other first party call control means such as communicating with an IVR, to move the call to the destination telephone 108. Alternatively, the ESB application 506 may formulate a similar transfer instruction for the call concurrent with the transfer of the workpacket to the resource 501. Of course, other call parking schemes may used other than utilizing two route points that have been used herein for illustration purposes. For example, a call may simply be parked at an IVR port.

The ESB application 506 may straddle multiple ACDs 102 and may also operate in conjunction with non-ACD/PBX equipment, such as the employee resources 404 shown in FIG. 4. Accordingly, embodiments of the enterprise service balancing system 410 may be applied to conventional call center installations without requiring costly physical modifications. For example, the first ESB route point 502 and the second ESB route point 504 may be added to the ACD 102 by simple adjustment of the ACD's existing functionality. Exemplary methods of creating such route points in an ACD/PBX are disclosed in U.S. patent application Ser. No. 09/060,038, which has been previously incorporated herein by reference.

The ESB application 506 in directing a call to be transferred from the first or second ESB route points 502, 504 may even direct the transfer of the call into another call center or to other equipment, such as equipment associated with the employee resources 404, according to an embodiment of the invention. Such an embodiment of the invention would require that the ACD 102 either have a PBX or a phone switch capable of undertaking such operations. As previously discussed, an auto-attendant PBX function may be used to send a call to a back-office resource.

In the call center 510, the ACD skill/split hunt group 106 performs little if any processing. However, the ACD's routing programs may be configured to utilize the ACD skill/split hunt group 106 upon notification that the ESB application 506 has ceased processing calls. This condition might arise due to error or programmed maintenance.

The enterprise service balancing system 410, unlike conventional Network ACDs does not typically move a call to a resource until the resource is available to receive the call. The enterprise service balancer incurs no extra cost to move calls, no expensive ACD communications circuits or software to offer calls at multiple call centers, no extra cost to move calls a second time, and service control is extended to call center agents and back-office agents (non-call center agents). The enterprise service balancer 401 also extends service to a much larger pool of agents such as may be required to meet peak service requests. The enterprise service balancer 401 provides greater effectiveness by eliminating the need to pass through an ACD's conventional processing in order to reach the person who will process the call. As discussed, the enterprise service balancer 401 does not queue a call on a remote ACD based on a statistical indication that the call might be serviced within an acceptable time period. The enterprise service balancer 401 instead determines service with an enterprise wide view at the instant a resource becomes available to take a new call.

FIG. 6 illustrates a call center 640 that provides enterprise service balancing without requiring utilization of an ACD, according to an embodiment of the invention. As previously discussed, the enterprise service balancing system 410 does not require that the enterprise utilize an ACD. The enterprise service balancing system only requires a telephony switching system that may provide third party and at least first party call control, such as may be provided by a PBX, IVR, or a simple PC-based switching system. A simple PC-based switching system could be a set of hardware cards that are part of the workstation that is executing the ESB application. In first party call control, call recipients is directly control calls through telephony equipment attached to their telephone. For example, an IVR represents an example of first party call control wherein the call to be transferred is at an IVR port on the ACD/PBX. The customer requests to speak with an agent, and typically the IVR port handling the call performs a blind transfer of the customer to an ACD queue. Transfer of the call on the IVR port could also be requested by an external application; that is the external application makes a transfer request over a data network to the specific IVR. In this case, the IVR port "owns" the call and performs a first party call control transfer, just as it had for the customer request to speak with an agent. In some implementations, the IVR may be standalone and may not be connected to an ACD/PBX. In third party call control, call recipients, or others, control calls through a connection with an ACD/PBX and take control of a call independently of the device that currently has control of the call. An example of third party call control is a CTI link that provides control of any call on any phone device to an external application. For example, a call is at an extension 43400 and a customer is communicating with an agent. With third party call control, an external application takes this call away from the telephony device 43400 and performs a supervised transfer of the call to a different agent without using the telephony device 43400 for performing this action. Both third party and first party call control allow the enterprise service balancing system 410 to park a call and then distribute the call to an enterprise resource, e.g., an agent. Of course, as discussed with respect to FIG. 5, since ACDs represent the predominate telephony switch in conventional call centers, embodiments of the enterprise service balancing system will work with any ACD or other switching system that provides third party and at least first party call control.

The call center 640 having three geographic sites 630, 632, 634 does not require an ACD and instead merely requires the use of phone switches 610, 612, 614 and IVR ports with first party call control 601, 603 that can be controlled by Work Pushers 618, 619. An ordinarily skilled artisan will also note that no CTI link is required. The call center 640 may contain more than the two IVR ports shown in FIG. 6. The phone switches 610, 612, 614 include the equipment necessary to provide standard telephony functions, such as a dial tone, the ability to make a call, the ability to receive a call, and the ability to transfer a call. In addition the phone switches 610, 612 have the IVR ports with first party call control 601, 603 that are accessible to the Work Pushers 618, 619. Such functionality is typically provided by an IVR via IVR software application interfaces. The call center 640 may be linked with other similar call centers within the enterprise and may also be linked with other enterprise-operated call centers that utilize an ACD/PBX, such as the call center 510 shown in FIG. 5. For example, the ESB application 506 may communicate relevant information to the call center 640. As previously discussed, the enterprise service balancing system 410 may wrap around the various elements comprising an enterprise's existing call-processing capabilities. For example, enterprise service balancing capabilities may be added to an enterprise's existing ACDs, PBXs or IVRs, as well as to newly designed call centers, so as to create a call-handling superstructure over the enterprise's communications facilities. The call center 640 illustrates a distributed call center designed to interface with an enterprise service balancing system 620 and the work pushers 618, 619, in this instance interfacing with equipment and resources in the distributed call center sites 630, 632, 634.

The distributed call center 640 further comprises agent workstations 605, 606, each at a different physical location 632, 634 respectively. The call center 640 may comprise more agent workstations than shown in FIG. 6. The agent workstations 605, 606 may be configured for call center type call processing and respectively include the Work Pushers 618, 619 and telephones 607, 608. The call center 640 further includes an ESB workstation 620. The ESB workstation 620 includes an ESB application 611. The telephone switches—the IVRs 610, 612—provide a mechanism for parking calls while waiting for selected enterprise resources to become available. This design has the desired result of parking the call at the point of entry to the call center 640 and not moving a call until the proper resource has been identified to receive the call.

The call center 640 further includes a staff database 604 that contains data related to agent and employee resources throughout the enterprise and includes the resources' availability for ESB call distribution. Other methods my be used to ascertain agent availability, including whether an agent is on a current call. The ESB workstation 620 may also access a customer database 615 that contains information related to customers and their transactions with the enterprise.

A customer 607 places a call into the call center 640 through the PSTN 101, and the call arrives at the IVR phone switch 610 and is connected to the IVR port associated with the IVR application 601. The IVR phone switch 610 interacts with the customer while communicating the arrival of the call via the WAN 636 to the ESB workstation 620. The ESB application 611 then examines the call to determine its pertinent characteristics and may also retrieve data from the customer database 615 in performing its analysis. The ESB application 611 also constructs a workpacket containing relevant items for the resource (e.g., an agent) who will process the call. The workpacket may comprise appropriate information retrieved from the caller via the PSTN 101, the IVR 610 and from the customer database 615. The ESB application 611 assigns attributes to the workpacket consistent with this particular customer interaction and consistent with the skills stored in the staff database 604 for processing the call.

The work pushers 618, 619 on each Work Station 605, 606 updates the staff database 604 regarding availability, where availability for this illustration is simply "Available to be pushed work from the ESB" or "Not Available to be pushed work." Other methods may be used for notification to the ESB such as work pushers directly interacting with the ESB or the ESB directly interacting with the work pushers or any other means by which a work pushers status can be known.

If there is no further customer interaction with the IVR 610 and the call may be distributed to an agent at either the workstation 605 or the workstation 606, then the call remains parked at the VRU 610 and the ESB application 611 makes the workpacket available to any Work Pusher 618, 619. Note that no interaction is actually required between the IVR 610 and the customer 607. Also the interaction may be a simple request for the customer's identification code such as might be requested by even a PBX or a PC based switching system.

Assume that an agent associated with the workstation 605 then becomes available and the Work Pusher 618 requests a workpacket appropriate for this agent's skill set. The ESB application 611 identifies the workpacket to the Work Pusher 618. The Work Pusher 618 then requests the workpacket from the ESB application 611. The ESB application 611 then sends the workpacket corresponding to the call being held at the IVR 610 to the Work Pusher 618.

The Work Pusher 618 opens the workpacket and retrieves the address of the IVR application 601 associated with the call on the IVR 610 and requests the IVR application 601 to transfer the call to the phone number for its associated phoneset 607. The phone number may be a simple number or it may be a set of instructions to traverse telephony network equipment to reach the phoneset 607. The IVR application 601 acknowledges the successful transfer of the call to the Work Pusher 618. While waiting for the call to arrive, the Work Pusher 618 delivers the workpacket data to the workstation application to allow this application to provide a "screen pop" on the workstation 605. The "screen pop" provides customer information and may also guide the agent in the handling of the call. Upon arrival of the call at the phoneset 607 the Work Pusher 618 will inform the IVR application 601 of the call arrival.

This set of actions completes the distribution of the customer 607 to a resource represented by workstation 605 that is available and has the skills to handle this customer request. Note that the above scenario works in a similar manner should the agent represented by the Work Pusher 619 in the geographic site 634 have been requested the call before Work Pusher 618. If both the Work Pushers 618, 619 had been both available but not equally qualified, then the ESB application 611 would select between the two Work Pushers based on their associated agent skills and the ESB application's knowledge of other outstanding requests for agent skills. All else being equal, the ESB application 611 may select the Work Pusher 618 over the Work Pusher 619 because the Work Pusher 618 has been the most idle agent, or the least occupied agent. In any event, a call arriving at either the IVR 610, 612 can be distributed to any agent in either geographic center 632, 634 via the PSTN 101 and WAN 636.

As previously discussed, in some embodiments of the invention, the Work Pusher module may transfer the workpacket to an agent workstation 605 while retaining the call at the VRU 610, allowing the selected resource to decide whether to perform the work in the workpacket or return the workpacket to the ESB application 611 for processing by another enterprise resource. For example, the ESB application 611 moves the workpacket to the Work Pusher 618. The agent at the agent workstation 605 reviews the workpacket and decides whether to process the customer call. If the agent decides to process the customer call, and provides a call-processing indication to the Work Pusher 618, then the Work Pusher application 618 sends a call-transfer notice to the IVR application 601. The Work Pusher 618 sends back to the IVR application 601 a phone number for the agent telephone 607 associated with the agent workstation 605. The IVR 610 then transfers the call to the telephone 607 using the telephone number provided by the Work Pusher 618. Once the call has been transferred, the VRU application 601 notifies the Work Pusher 618 of the call's transfer. If the agent determines to not process the customer call, and provides a call-processing indication to the Work Pusher 618, then the Work Pusher 618 sends a notification to the ESB application 611 that it is not processing the call. The Work Pusher 618 may then request additional work. The ESB 611 application will then distribute the workpacket for this call to some other Work Pusher or other agent that may not have an associated Work Pusher.

The call center 640 may also transfer calls to a telephone 644. The telephone 644 represents an enterprise resource that is not equipped to interact with a workflow system such as the agent workstations 605, 606. That is, a workstation 641 associated with telephone 644 has no capability to directly manipulate workpackets in a high-speed production environment such as is associated with call center agents. This lack of functionality may be a function of the specific workstation capabilities associated with the telephone 644 or the location of the workstation 641, such as a remote employee working from home. Such enterprise resources may typically be found in the employee resources 404 shown in FIG. 4. The call center 640 may provide additional functionality for providing workpackets to the enterprise resource associated with the telephone 644. If the call is to be directed to the telephone 644, the ESB application 611 may seek out alternative routes for transferring the workpacket to the employee resource associated with the telephone 644. For example, the ESB application 611 may construct an e-mail message to the workstation 641 associated with the employee resource at the telephone 644 that informs the employee resource of the location for the workpacket. The ESB application 611 may even bundle the workpacket with the e-mail message. This alternative communication means with the workstation associated with telephone 644 may be provided by a conventional workflow system whose capabilities include using an e-mail channel for moving workpackets.

The ESB implementation for the call center 640 using the ESB application 611 and the Work Pushers 618, 619 is but one possible design for associating work with a call and pushing the work and call to the agent workstations 605, 606 and the agent phonesets 607, 608. The ESB implementation for the call center 640 is a connected model where all clients are connected over a data network to the ESB application 611 and does not specify any particular means for establishing connections or interchanging or messages across a connection. An exemplary implementation for providing connectionless models where connections are made and broken based on the need for participation, such as might be made by a more centralized ESB application 611, and using object oriented techniques that includes agent-to-agent transfer of calls outside of the ESB application is disclosed in U.S. patent application Ser. No. 09/235,065 "Call Center Telephone and Data Flow Connection System," filed on Jan. 21, 1999, assigned to the Mosaix Corporation, and which is incorporated herein by reference.

FIG. 7 illustrates exemplary ESB selection criteria 701 that provide data for enabling an embodiment of the enterprise service balancer 401 to determine the precise enterprise resource to receive a call. The enterprise service balancer examines the ESB selection criteria set 701. ESB sources 702 provide the data in the ESB selection criteria set 701 and may include a customer database 703, an IVR data set 704, and call data 705. The call data 705 comprises intrinsic information that may be automatically retrieved from a telephone call without requiring any operation on the part of the caller, such as the caller's phone number (ANI), the number they called (DNIS for "800" numbers), the type of location from which they are calling (II digits provide phone booth, prison, etc.), or may include Customer Entered Digits ("CED") which the customer may have entered by request of a network service. The IVR data set 704 represents information gathered from the caller via some type of querying mechanism (e.g., a menu). The customer database 703 represents data derived from a call database that includes data related to both the caller and the enterprise's resources. The ESB sources 702 may include additional ESB sources and may also include fewer ESB sources.

The ESB selection criteria set 701 provides a data template that may be consulted by the enterprise service balancer 401 in determining the appropriate resource to receive a customer call. Exemplary ESB selection criteria in the ESB selection criteria set 701 include the telephone number called (for example, a particular call center client's 800 number), the caller's telephone number (that may be used to retrieve customer-related data), Customer Entered Digits, the call's time of arrival, the caller's location (determined either from the caller's telephone number, the 800 number or from a customer database), the caller's account number, the caller's account status, the caller's requested transaction, options selected by the caller, the service level category to be associated with this caller on this transaction (e.g., Platinum customer class), the call's urgency, the last agent contacted by the caller, the caller's security information, the caller's past transaction data, the caller's preferences (which may be obtained from both the customer database and by querying the client), the caller's present disposition (which may be determined from the IVR 704), and a prior agent assessment regarding the caller.

Since an enterprise may alter its ESB selection criteria, the ESB selection criteria set 701 may contain different criteria than those presently shown. Moreover, the ESB selection criteria set 701 may contain additional items or even fewer items than shown here. The enterprise may alter and reconfigure the ESB selection criteria set 701, and the enterprise may operate different ESB selection criteria for different operations within the enterprise. For example, different 800 numbers may have different ESB selection criteria associated with them. Similarly, the enterprise may consult with a different set of items from its ESB sources 702.

The enterprise service balancer may determine that not all of the items in the data template of the ESB selection criteria set 701 have a corresponding reference provided by the ESB sources 702 for a particular customer call. Accordingly, the enterprise service balancer may be constructed to select a resource for a call on the basis of less information about the call than its ESB selection criteria set 701 indicates.

The enterprise service balancer may also utilize data related to its resources, such as its call center agents, in matching a call with the most appropriate enterprise resource. FIG. 8 illustrates a representative ESB agent table 800 that contains the type of data that an enterprise may wish to collect regarding its call center agents and then reference when selecting an appropriate resource for a call. The enterprise may utilize a different data set, and the enterprise may construct similar tables for its other resources.

The ESB agent table 800 contains criteria that may be utilized by embodiments of the enterprise service balancer in determining an appropriate agent to receive a customer call. The ESB agent table 800 may include an agent's qualified capabilities to service customers. These capabilities can be described as skills (types of work that are worked on by the enterprise), preferences (the ranking of skills for an agent), and skill rating (the capability of an agent to perform this skill). An agent may have a capabilities rating that represents a range of calls that the agent may receive based upon the difficulty of the tasks associated with the call, e.g., loan processing might be rated at as having a preference of "8" while checking the status of a check re-order might be rated as a "1." Given two calls available to this agent, of these two types (and all other factors being equal), the agent will take the loan processing call unless the ESB determines that the check re-order call should be taken to meet service levels.

The ESB agent table 800 may also contain an optimal service capabilities, or optimal skills level, for a particular agent. For example, the enterprise service balancer 401 will generally not distribute simple calls to agents having a higher than necessary degree of skills, but will instead route such calls to agents having a lower level of skills that is still high enough to satisfy the call's requirements. Aside from other pertinent assignment criteria, the enterprise service balancer will generally assign a call to the agent having the lowest acceptable skill level required for processing a given call. However, during certain peak service periods, the enterprise service balancer may need to select any agent capable of responding to the call, such as an agent with a higher than necessary skill level.

In some circumstances, the most appropriate agent to receive a call is the agent who last dealt with the caller. Accordingly, the ESB agent table 800 will also contain agent identification information and retain information related to calls recently processed by the agent.

An enterprise may be associated with various clients, as well as having enterprise subsidiaries, and the enterprise service table 800 also contains a listing of the clients, or subsidiaries, for which the agent may process calls. The enterprise service table 800 may also contain statistical information related to the speed with which the agent statistically can process workpackets for different skill types or client types. Such information allows the enterprise service balancer 401 to determine whether a particular agent will be occupied too long with the task associated with a given call. Collected from within the entire enterprise, such information allows the enterprise service balancer to determine whether optimal service levels should be utilized or whether qualified service levels should be utilized.

In addition, some embodiments of the enterprise service balancer may select one agent over another similarly qualified agent based on the agents' occupancy and how close each agent will be toward reaching the their occupancy if the agent receives the call. Occupancy is the percent of time agents are on calls. Exceeding 90% can lead to agent burnout which leads to agent's becoming less efficient in their work. Some designers of the ESB agent table 800 may not wish to mix real-time information (e.g., agent occupancy information) with static information. In some embodiments, a separate real-time data table 801 may be included that is updated with a variety of information provided by the enterprise service balancer. Of course, in other embodiments, the real-time data table 801 may be included within the ESB agent table 800.

Finally, the ESB agent table 800 may also contain information related to particular agent privileges, such as being allowed to directly receive telephone calls. The enterprise service balancer 401 may alter the availability of such privileges based upon the total call load within the enterprise at a given period of time. For example, during a peak period within the enterprise, agents may lose the privilege of receiving direct telephone calls (to their Agent DN) since their help is needed urgently in processing calls, according to an embodiment of the invention.

An exemplary method and system for establishing preference values and threshold values for service classes related to work items, such as may be utilized in the ESB agent table 800 and the enterprise service balancer 401, is disclosed in U.S. patent application Ser. No. 09/149,877, "Dynamically Assigning Priorities for the Allocation of Server Resources to Competing Classes of Work Based Upon Achievement of Service Level Goals," filed on Sep. 8, 1998, assigned to the Mosaix Corporation, and which is incorporated herein by reference.

Additionally, embodiments of the present invention may also operate in conjunction with a method and system for adjusting the availability of resources (e.g., agents) for performing various types of work. An exemplary method and system for adjusting the availability of resources for performing various types of work is disclosed in U.S. patent application Ser. No. 09/247,893, "Dynamically Allocating Server Resources to Competing Classes of Work Based Upon Achievement of Service Level Goals," filed on Feb. 10, 1999, assigned to the Mosaix Corporation, and which is incorporated herein by reference.

In addition, the present invention may also operate in conjunction with an exemplary method and system for computing a dynamic component in a composite preference value associated with a work item. An exemplary method and system for computing a dynamic component in a composite preference value is disclosed in U.S. patent application Ser. No. 09/248,047, "Hierarchical Service Level Remediation for Competing Classes Based Upon Achievement of Service Level Goals," filed on Feb. 10, 1999, assigned to the Mosaix Corporation, and which is incorporated herein by reference.

FIG. 9 provides further details regarding workpackets transferred to enterprise resources. Workpackets comprise data that the enterprise service balancer 401 has determined may be appropriate for the processing of a call. The data associated with the workpacket may be appropriately supplemented by the resources, such as an agent, through applications available to the resource, such as a call-handling application at an agent workstation. Accordingly, workpackets may have various sizes and will not all necessarily contain the same information. FIG. 9 illustrates two workpackets, a workpacket 901 and a workpacket 902, being sent to call center agents from the enterprise service balancer.

The workpacket 901 contains a set of caller data 903, a database link 904, client catalog protocols 905, and a call pointer 908. The call pointer 908 may be utilized in accessing the call associated with the workpacket 901. The client catalog protocols 905 may include a client catalog that may be helpful to the agent selected to process the call. The client catalog protocols 905 may be an expanded version of a client catalog that includes information not necessarily available to callers, such as links to warehouse data. The client catalog protocols 905 may also contain a client special instruction wizard 907 that contains special instructions for the agent in processing the call.

The workpacket 902 contains the caller data 903, the database link 904, a past transaction record 906, and the call pointer 908. The past transaction record 906 may be useful to the agent in answering the customer's call. For example, the workpacket 902 may be applicable in the processing of a customer call related to the status of an order.

FIG. 10 illustrates the linking of workpackets in a call parking facility utilized by the enterprise service balancer 401 while attempting to find an appropriate resource to process the call represented by the workpacket, according to an embodiment of the invention. An exemplary enterprise service balancer may have a variable number of associated parked calls at any given moment. For example, an enterprise service balancer may have workpackets 1001, 1002, 1003, and 1004. Each of the workpackets 1001–1004 has an associated call pointer 908 that may be used to retrieve the call associated with the workpacket. The workpackets also each have a resource identifier 1005. The resource identifier 1005 is usually incomplete while the enterprise service balancer 401 searches a set of appropriate resources representing the enterprise to process the call. If the enterprise service balancer 401 locates an available resource suitable for processing the work packet, then the enterprise service balancer 401 provides the identity of the resource in the resource identifier 1005. If the enterprise service balancer 401 has identified a specific resource that is not instantly available, but should be available within a configurable time period, then the resource identifier 1005 may contain an identifier for the resource. If the timeout expires, then an alternative resource will be selected by the enterprise service balancer 401.

The workpackets 1001–1004 may be linked to each other in a worklist 1000, as shown in FIG. 10, but do not necessarily need to be processed by the enterprise service balancer 401 in the order that they have been received. It is expected that there will be many different types of calls each type with different service requirements, and it is the arrival of agents to service these calls, each agent with different servicing capabilities, that determines the order in which calls will be distributed. Accordingly, it is unlikely this will be a First In First Out ("FIFO") distribution of calls except in the simplest of cases. In addition, the workpackets do not necessarily need to be kept in a linked list but may be organized in another data structure.

FIG. 11 illustrates an exemplary agent workstation 1110 for processing workpackets, according to an embodiment of the invention. Resources, such as agents, will interact with the enterprise service balancing system via an ESB client application in the agent's workstation, such as Work Pusher applications 618, 619 shown in FIG. 6. The ESB client application may even be provided to the resource using a browser application. The ESB client application may either be a thin client or a fat client. A thin client comprises a small application that retrieves much of its processing capabilities from a server while a fat client contains greater processing capabilities. Implementing the ESB client application as a browser application somewhat blurs the distinction between thin and fat clients. The agent workstation 1110 includes a computer 1103 having a GUI application 1106, a telephone 1102 and an agent head set 1101.

When an ACD agent becomes available, the agent typically actuates a ready button 1107 on the GUI application 1106 using a mouse 1109 or actuates a similar button on a desktop keyboard 1108. In the enterprise service balancing system 410, this agent action triggers a request to the enterprise service balancing system to provide the next workpacket. The enterprise service balancing system—based on the achievement of current service levels across the enterprise and which—if any—work can be handled by this call center agent—will then send a workpacket to the ESB client application associated with the agent's workstation 1110. The workpacket represents the best work for this agent to perform at this time, as determined by the enterprise service balancing system. If the agent actuates a retrieve call button 1104, the ESB client application will then make a request to the enterprise service balancing system to have the call directed to the headset 1101. Of course, the delivery of the call to the headset may be configured within the ESB application to be coincidental with the opening of the workpacket to obtain the parking address of the call and transfer the call to the headset 1101.

The enterprise service balancer allows a resource, such as the call center agent, to preview a workpacket without necessitating a connection to an associated call (or other work item). Because the agent's own application controls delivery of the call, the agent can preview a "screen pop" 1111 of customer information and decide whether to take the call or transfer it elsewhere using a transfer call button 1105. The resource may be performing other work at the time the workpacket arrives and decide to send the workpacket back to be distributed to another enterprise resource. The ability to decline workpackets may be especially helpful to back-office agents who perhaps do not normally handle calls and may wish to accept only selected calls. The transfer call button 1105 may also initiate transfer of a customer call to another resource within the enterprise. For example, the resource at the agent workstation 1110 may discover during processing of the call that the call would be better processed by another resource within the enterprise. Accordingly, by actuating the transfer call button 1105, the resource may place the customer call at precisely the best location with the enterprise for further processing. In the preferred embodiment, the transfer sends a notification to the enterprise service balancer 401 to redistribute the call since the agent's knowledge of the best resource may be incomplete.

The ESB client application interacts with the GUI application 1106 to provide the workpacket screen pop 1111 to the resource. The initial screen pop may not necessarily contain all of the information in the workpacket fully displayed. The additional information may be retrieved by the resource as necessary. For example, the workpacket may contain other media references such as optical images. When the resource accesses a work item in a workpacket, the work item may be moved (or opened) and presented to the resource.

In typical CTI event-driven implementations, the CTI event arrives and triggers a "screen pop," while at the same time the ACD/PBX (or a similarly functioning switch) performs an uncontrolled delivery of the call to the agent's headset. Having two separate systems provide the two items needed by the agent, the customer information associated with the screen pop and the call itself, creates a race condition between the screen pop and the call arrival that necessitates some system for synchronizing the screen pop and the call arrival. The enterprise service balancer 401 eliminates this race condition by directing that the workpacket's arrival occur prior to sending the call to the agent's headset 1101, according to an embodiment of the invention.

The agent (resource) may retrieve a specific parked call for continued processing by actuating the retrieve call button 1104, as previously discussed. In one embodiment, the agent may actuate the retrieve call button 1104 by using either a combination of hot keys or by clicking on the retrieve call button 1104 using a cursor controlled by the mouse 1109. In another embodiment, the computer 1103 may be provided with a touch-sensitive screen and the agent may simply touch the retrieve call button 1104. By actuating the retrieve call button 1104, the agent initiates continued processing of a parked call.

In some embodiments, parked calls may be parked at a remote location. In the preferred embodiment, parked calls are simply redirected to the telephony device 1102 at the agent workstation 1110. This call transfer occurs through the enterprise service balancer's work pusher (e.g., the work pusher 410 shown in FIG. 4) that supplies the telephony device address to the call parking component at the remote location. In other embodiments, the retrieval process utilizes a centralized ESB application that incorporates this work pusher function to move the parked call to the agent workstation 1110, as would occur for the telephone 644 in FIG. 6.

FIG. 12 illustrates additional information that may be retrieved in an exemplary workpacket 1200 processed by an enterprise resource. The exemplary workpacket 1200 includes the customer's name, the customer's telephone number, the customer's account number, and the customer's level of service. The workpacket 1200 also indicates that the customer has been secured. Security may be provided by requiring the customer to enter a code, for example, and may be satisfied by automated processing before the call reaches the agent. The workpacket 1200 also identifies the client and relevant information regarding the client, such as a corporate motto.

The workpacket 1200 also indicates the urgency of the call. The workpacket 1200 may further indicate when the call arrived, the present time, and the amount of time that the caller has been waiting. The workpacket 1200 may also indicate the customer's last order, its status, and additional relevant information, such as an identification of the agent who processed the customer's last order. The workpacket 1200 may also provide the agent with the caller's preferences.

FIGS. 13A and 13B comprise a flowchart 1300 illustrating the processing of a call in an enterprise service balancing system 410 utilizing an enterprise service balancer 401, according to an embodiment of the invention.

The enterprise service balancer 401 receives a call (step 1301). The enterprise service balancer analyzes the call and begins composing a workpacket (such as shown in FIG. 12) that contains pertinent information about the call (step 1303). Based upon its analysis of the call, the enterprise service balancer determines the pertinent call properties (step 1305). The pertinent call properties may include data such as that shown in the ESB selection criteria set 701 shown in FIG. 7. The enterprise service balancer may add some of the pertinent call properties to the workpacket. The enterprise service balancer determines whether database data should be retrieved for further determination of pertinent call properties (step 1307). If the enterprise service balancer determines that database data should be consulted in determining the disposition of the call (step 1307), then the enterprise service balancer retrieves the appropriate data from a database (step 1309). The enterprise service balancer may add some, or all, of the data from the database to the workpacket. The enterprise service balancer then analyzes the database data associated with the previously identified and pertinent call properties (step 1311).

Based upon the information that it has received thus far, the enterprise service balancer 401 then selects an appropriate enterprise resource to dispose of the call (step 1313). If database data is not necessary (step 1307), then the enterprise service balancer 401 proceeds to step 1313. In selecting an appropriate enterprise resource, the enterprise service balancer may consult data such as that shown in the ESB selection criteria table 702 shown in FIG. 7 and may also analyze pertinent information regarding resources such as the ESB agent table 800 shown in FIG. 8. For example, this database may contain information regarding the real-time availability of resources. The enterprise service balancer then determines the best available call-receiving resource (step 1315) and sends the workpacket to the selected call-receiving resource (step 1317). If no such resources are available (step 1315), the call will continue to be parked until such a resource becomes available. As previously discussed, the initial screen pop associated with a workpacket's arrival at the resource's workstation may comprise a smaller subset of data than the complete workpacket itself.

While waiting for a resource to become available, and if this call is more important than other calls vying for the appropriate resource, then the enterprise service balancer may determine to expand the number of resources that are appropriate to handle this call (step 1319). The enterprise service balancer may determine to expand the number of resources that are appropriate to service this call, including non-human resources such as IVR resources or Voice-Mail for self-servicing. The enterprise service balancer 401 determines the scope of resources based on all competing calls and or other competing work and the manner in which to either increase or even decrease the number of resources available to service the call. This evaluation may include acquiring additional information from a number of different resources and including the customer via an IVR communication. An exemplary method and system for dynamically managing the scope of resources within an enterprise environment is disclosed in U.S. patent application Ser. No. 09/247,893, "Dynamically Allocating Server Resources to Competing Classes of Work Based Upon Achievement of Service Level Goals," filed on Feb. 10, 1999, assigned to the Mosaix Corporation, and which has been previously incorporated herein by reference. Once such an evaluation has completed, the processing returns to Step 1315. An ordinarily skilled artisan will recognize that this is a description of a process using a flowchart and that the step 1319 may occur independently and concurrently with Step 1315.

Once the selected call-receiving resource has received the workpacket, the call-receiving resource may examine the workpacket to determine if the resource will provide further processing of the workpacket or its associated customer call. If the call-receiving resource elects to process the workpacket, then the call may be transferred to telephony equipment associated with the call-receiving resource.

FIG. 14 illustrates an exemplary enterprise service balancing system 1410 that processes customer communications arriving from a variety of media, according to an embodiment of the invention. As previously discussed, the enterprise service balancing system is not limited merely to processing customer communications arriving from a telephony medium. Customer communications may arrive from a variety of media, such as telephony, e-mail, Internet telephony, Internet communications, video kiosk, and other forms of video streaming applications.

The enterprise service balancing system 1410 comprises an enterprise service balancer 1401, communication processing applications 1402–1406, and a database 1407. The communication processing applications 1402–1406 may comprise call-handling and Work Pusher applications such as those shown in FIGS. 5 and 6, as well as FIG. 11. The communication processing applications 1402–1406 may operate with work pushers, with one or more conventional ACDs, or with other similar functioning equipment. The ellipsis between the communication processing application 1405 and the communication processing application 1406 indicates that the enterprise service balancing system 1401 may comprise more communication processing applications than shown in FIG. 14.

The enterprise service balancer 1401 receives customer communications from a variety of media as shown. The ellipsis between medium 3 and medium 4 indicates that the enterprise service balancer may process customer communications received from more than four different mediums. Of course, the enterprise service balancer 1401 may also process customer communications received from a smaller number of communication media.

The enterprise service balancer 1401 receives customer communications and processes the customer communications in a manner similar to that discussed with regard to the other embodiments of the enterprise service balancer. However, the enterprise service balancer 1401 has additional capacity for selecting an appropriate resource to process a customer communication on the basis of the medium from which the customer communication arrived in the enterprise service balancing system 1410. For example, the enterprise service balancer 1401 may direct that an e-mail customer communication, which is not an interactive communication, be processed differently by the communication processing applications 1402–1406 than a customer communication that is interactive, such as one arriving from telephony or video streaming. The enterprise service balancer 1401 may extract and analyze customer and resource data from the database 1407 as appropriate.

From the foregoing it will be appreciated that, although specific embodiments of the invention have been described herein for purposes of illustration, various modifications may be made without deviating from the spirit and scope of the invention. Accordingly, the invention is not limited except as by the appended claims.

While the present invention has been described with reference to preferred embodiments thereof, those skilled in the art will appreciate that various changes in form and detail may be made without departing from the intended scope of the present invention as defined in the appended claims. For example, the elements associated with the enterprise service balancer, and the workstations may differ from those shown in the figures, and enterprise service balancer applications associated with the enterprise service balancer (e.g., a Work Pusher) might be provided to support various additional functions. Workstation applications in addition to being interacted with by a human may also be interacted with by a robotic application. Accordingly, embodiments of the invention are applicable to call centers staffed entirely with human agents, call centers having hybrid robotic and human agent workstations, and call centers having completely robotic applications.

The enterprise service balancer may be run on different types of computing systems or on computing systems differing substantially from the enterprise service balancing system discussed herein. In addition, the elements associated with the enterprise service balancer within a given call center may each operate on a different type of computing system provided that the enterprise service balancer ultimately performs the tasks described herein. Elements of the enterprise service balancer modules may be provided in microcode in a hardware device, such as that provided on a computer chip or an application specific integrated circuit ("ASIC"). Elements of the enterprise service balancer may also be invoked through a specialized call center telephone such that selection, or actuation, of a button on the specialized call center telephone initiates operation between the telephone and the enterprise service balancer. Other equipment associated with embodiments of the enterprise service balancing system may also be provided in microcode in hardware devices, such as a computer chip or an ASIC. For example, the enterprise service balancer itself may be comprised of one or more ASICs in one or more call centers that communicate with each other in such a manner so as to provide the functionality described herein.

In one exemplary alternative embodiment, the enterprise service balancer may be provided as a plug-in device at a call center. In this embodiment, a utility program could be run in the call center to appropriately configure the call center for operations with the plug-in device. Such a device would operate in all significant respects in the same manner as the embodiments described herein. In another embodiment of the invention, the enterprise service balancer may be merged into an ACD/PBX. The enterprise service balancer may be programmed in any programming language. The enterprise service balancer may interface with CTI middleware products, as such IBM Callpath, Genesys T-Server, or Dialogic CT-Connect.

The enterprise service balancer may be configured to operate with a variety of call-directing devices. In addition, an initialization program may operate in connection with the resources in the enterprise and the enterprise service balancer to enter the site-specific information, such as the Agent DNs for the agents within a call center and the Phone DNs for the call center telephones. The initialization program may also allow logical functions, like the Agent DNs, to be matched to physical functions like the Phone DNs. In some instances, there may only be Phone DNs, and the agent's personal data network identification, such as a workstation login supplants the Agent ID. The initialization program may further assign the appropriate calling scripts for the routing points.

In one embodiment the enterprise service balancer 506 utilizes the ACD 102 to distribute calls to agents while managing service levels for calls and for all other channels such as e-mail, fulfillment (e.g., research a billing inquiry), and fax as in 1402. The enterprise service balancer 506 may control ACD call distribution by making agents 120 available or not-available to receive calls through control of the agent's ACD state, either through 1st or 3rd party call control means. With this control means an agent is always in the ACD "NOT READY to take a call from the ACD" ACD state unless the enterprise service balancer 506 determines that the best work for this agent is to take an ACD 102 distributed call. To receive an ACD 102 distributed call, the agent 120 is placed into a "READY to take a call from the ACD" ACD state by the enterprise service balancer 506 and the agent will receive a call from the ACD 102. The calls being distributed may either be parked at an ESB route point 502, 504 and are redirected by the ESB 506 to a ACD Skill/Split Hunt Group 106, 107 at the time an agent is made available or after calls are processed by the ESB application 506, the calls are simply parked (queued by the ACD) at ACD Skill/Split Hunt groups 106, 107 waiting for an agent logged into one or more ACD Skill/Split Hunt groups to become READY. In either implementation, it is the ESB 506 that controls the distribution of calls to an agent 120. If an ACD call is not the best work at this time for this agent, then the agent will receive some other non-ACD work. This exemplifies that even an ACD 102 can be treated as a switching system and can be controlled by the enterprise service balancer 506.

The enterprise service balancing system may also produce an event log of the customer communications and workpackets transferred to one or more enterprise resources. The log data may be stored in a data repository associated with the resource or may be stored in a remote database. The log may be examined by appropriate supervisory personnel to ensure that the enterprise services balancing system is finctioning within expected parameters.

If a caller hangs up while the enterprise service balancer is either attempting to locate an appropriate resource or is in the process of transferring the call to the selected resource, a telephony sub-system (e.g., a CTI link) may notify the enterprise service balancer of this event through a call disconnected message. The enterprise service balancer then removes the workpacket from consideration for call delivery but then forwards the workpacket for further processing by the workflow system (e.g., for Platinum callers, place the call in a priority call back worklist).

In yet another embodiment, the enterprise service balancer may direct a blind transfer of a call to an enterprise resource. A blind transfer is a call transfer in which the transferor indicates a transfer location for a call without checking whether the new transferred location is available. For example, in a conventional telephone system, a caller is typically placed on hold, then the transferor dials a telephone number and hits a transfer button which initiates an automatic transfer of the call. A blind transfer contrasts with a supervised transfer in which the transferor actually verifies that the transferred number is available before the call is transferred. A blind transfer might be used by the enterprise service balancer to queue a call to a specific resource such as a hunt group robotic resources like IVR ports.

Although specific embodiments of, and examples for, the invention are described herein for illustrative purposes, various equivalent modifications are possible within the scope of the invention, as will be recognized by those skilled in the relevant art. The teachings provided herein of the invention can be applied to other enterprise communication systems, not necessarily the exemplary enterprise communication system described above. Various exemplary computing systems, and accordingly, various other system configurations can be employed under the invention.

The embodiments of the invention disclosed herein have been discussed with regard to enterprise communications systems, such as those using large computing systems. However, the invention finds applicability in other computing systems, such as small, portable computerized systems and even de-centralized computing devices distributed in a network. The enterprise service balancer may be utilized for transferring data only, calls only, or even other types of connections.

These and other changes can be made to the invention in light of the above detailed description. In general, in the following claims, the terms used should not be construed to limit the invention to the specific embodiments disclosed in the specification and the claims, but should be construed to include all distributed resource allocation systems that operate in accordance with the invention. Accordingly, the invention is not limited by the disclosure, but instead its scope is to be determined by the following claims.

What is claimed is:

1. A method for processing customer communications received by a communication-processing system that comprises a plurality of communication-processing resources, each with a communication-processing resources set that includes a description of the communication-processing resource, comprising:

receiving a customer communication into the communication-processing system;

parking the communication at a location that is not dedicated for use by some communication-processing resources of the system to an exclusion of other communication-processing resources of the system;

analyzing the customer communication to create a communication properties set;

selecting a communication-processing resource of the plurality of communication-processing resources by comparing the communication properties set against the communication-processing resources set that includes a description of the communication-processing resource for at least a portion of the communication-processing resources, wherein the selecting step is made irrespective of whether the communication-processing resource is presently available and free to process the transaction and/or is presently busy with other work;

sending a new work indicator to the selected communication-processing resource, the new work indicator comprising information in both the communication properties and the communication-processing resources sets, wherein the new work indicator comprises a pointer to the communication;

receiving a reply from the selected communication-processing resource, the reply indicating whether or not the selected communication-processing resource elects to service the customer communication; and when the selected communication-processing resource elects to service the customer communication, requesting that the transaction pointed to by the new work indicator be connected to an address of the selected communication-processing resource provided in the request, transferring the communication for processing from the location where the selected transaction is parked to the address provided in the request, and thereafter forwarding to the selected communication-processing resource customer further customer-related information not included in the new work indicator.

2. The method of claim 1, further comprising when the selected communication-processing resource elects not to service the customer communication, thereafter not forwarding to the selected communication-processing resource customer further customer-related information not included in the new work indicator.

3. The method of claim 1 wherein the new work indicator is associated with the customer communication and comprises a plurality of a customer identifier, a customer's level of service, historical transaction records for the customer, and a database link referencing customer information associated with the customer, the method further comprising:

selecting data from the communication properties set and including the selected data in the new work indicator.

4. A system for processing calls received by a call-processing system that comprises a plurality of call-processing resources, each with a call-processing resources set that includes a description of the call-processing resource, comprising:

at least one call receiver that receives calls;

a call parking application operable to park a received call at a location that is not dedicated for use by some call-processing resources of the system to an exclusion of other call-processing resources of the system; and an enterprise service balancer that comprises:

a receiver that receives a call notification from the at least one call receiver pertaining to a received call;

an analyzer that analyzes the received call to compose a call properties set for the received call;

a comparator that selects one of the call-processing resources of the plurality of call-processing resources to process the received call by comparing the call properties set with the call-processing resources set for at least a portion of the call-processing resources; and a transmitter that sends a new work indicator to the selected call-processing resource, the new work indicator comprising information from each of the call properties and call-processing resources sets, wherein the information comprises a pointer to the received, parked call; and a work pusher operatively connected to the enterprise service balancer that directs the transfer of the received, parked call to the selected call-processing resource after the new work indicator has been received by the selected call-processing resource.

5. The system of claim 4 wherein the new work indicator comprises a plurality of a call pointer, a caller identifier, a caller's level of service, historical transaction records for the caller, and a database link referencing caller information associated with the caller.

6. The system of claim 4, wherein the selected call-processing resource is not instantly available but may be available within a configurable time period, the enterprise service balancer parks the received call and assigns to a resource identifier associated with the call an identifier associated with the selected call-processing resource, and, if the selected call-processing resource is not available to service the call within the configurable time period, the comparator selects a different call-processing resource to service the call.

7. The system of claim 4 wherein the description of the call-processing resource includes a skill level, and wherein the comparator's comparison of the call properties set against the call-processing resources set to select the call-processing resource comprises selecting the selected call-processing resource to have an adequate skills level among a set of available call-processing resources in the plurality of call-processing resources.

8. The system of claim 4 wherein the call-processing resources set includes a plurality of an agent skills level, an optimal skills range, a qualified skills range, an agent identification, an agent telephony address, and a recent customer transaction list.

9. The system of claim 4, wherein work pusher directs the transfer of the received call when the selected call-processing resource has elected to service the received call.

10. The system of claim 4, wherein the comparison by the comparator to individually select a call-processing resource from among the plurality of call-processing resources is made irrespective of whether the resource is presently available and free to process the call or is presently busy with other work.

11. The system of claim 10, wherein, when an individual call-processing resource is available and free to process a call, the comparator is operable to use predetermined objectives and information in workpackets of the calls that are waiting to be processed to individually select a waiting call for processing by the individual resource from among all waiting calls whose workpackets either identify the individual resource or identify determined required attributes that are all possessed by the individual resource.

12. The system of claim 4, wherein the work pusher does not direct the transfer of the received, parked call when the individual resource, using the information in the sent new work indicator, determines, based upon predetermined objectives, that it will not process the received, parked call pointed to by the sent new work indicator.

13. A system for processing customer communications received by a communications-processing system that comprises a plurality of communications-processing resources, each with a communication-processing resources set that includes a description of the communication-processing resource, comprising:

at least one communications receiver that receives customer communications;

a communication parking application that parks a received communication at a location not dedicated for use by some communication-processing resources of the system to an exclusion of other communication-processing resources of the system; and an enterprise service balancer that includes:

a receiver that receives a customer communication notification from the at least one communication receiver pertaining to a received communication;

an analyzer that analyzes the received communication to compose a communication properties set for the received communication;

a transmitter that sends a new work indicator to the selected communication-processing resource, the new work indicator comprising information from each of the communication properties and communication-processing resources sets, wherein the information comprises a pointer to the received, parked communication;

a work pusher operatively connected to the enterprise service balancer that directs the transfer of the received, parked communication to the selected communication-processing resource after the new work indicator has been received by the selected communication-processing resource; and a comparator that selects a communications-processing resource of the plurality of communications-processing resources to process the customer communication by comparing the communication properties set with the description of the communication-processing resource set for at least a portion of the communication-processing resources, wherein, when the selected communications-processing resource is not instantly available but may be available within a configurable time period, the communication parking application parks the communication, and, when the selected communications-processing resource is not available to service the communication within the configurable time period, the comparator selects a different communications-processing resource from among the plurality of communications-processing resources to service the communication.

14. The system of claim 13 wherein the selected communications-processing resource, after reviewing the new work indicator, elects to service the communication and the enterprise service balancer thereafter provides further customer information to the selected communications-processing resource.

15. The system of claim 13 wherein the new work indicator comprises a plurality of a communication pointer, a customer identifier, a customer's level of service, historical transaction records for the customer, and a database link referencing customer information associated with the customer.

16. The system of claim 13 wherein the work pusher comprises:
   a first communications link for transmission of the new work indicator;
   a second communications link for transmission of any associated media with the customer communication;
   a receiver configured to receive a transfer request over the first communications link from the selected communications-processing resource that includes the selected resource's addresses on the first and second communication links, to establish a second communications link with the selected communications-processing resource, to transfer the new work indicator to the selected communications-processing resource over the first communications link, and to transfer any associated media over the second communications link.

17. The system of claim 13 wherein the communication-processing resources set includes a plurality of an agent skills level, an optimal skills range, a qualified skills range, an agent identification, an agent telephony address, and a recent customer transaction list and the enterprise service balancer assigns to a resource identifier associated with the customer communication a value associated with the selected communications-processing resource.

18. The system of claim 13, wherein the comparison by the comparator to individually select a communications-processing resource from among the plurality of communications-processing resources is made irrespective of whether the resource is presently available and free to process the communication or is presently busy with other work.

19. The system of claim 18, wherein, when an individual communication processing resource is available and free to process a communication, the comparator is operable to use predetermined objectives and information in workpackets of the communications that are waiting to be processed to individually select a waiting communication for processing by the individual resource from among all waiting communications whose workpackets either identify the individual resource or identify determined required attributes that are all possessed by the individual resource.

20. The system of claim 13, wherein the work pusher does not direct the transfer of the received, parked communication when the individual resource, using the information in the sent new work indicator, determines, based upon predetermined objectives, that it will not process the received, parked communication pointed to by the sent new work indicator.

21. A method of processing transactions in a transaction-processing system, comprising:
   in response to receipt of a transaction for processing in the transaction-processing system, parking the transaction at a location that is not dedicated for use by some transaction-processing resources of the system to an exclusion of other transaction-processing resources of the system;
   generating a workpacket of information associated with the transaction and including a pointer to the transaction;
   determining attributes that a transaction-processing resource must possess in order to process the transaction;
   optionally, using the determined required attributes to individually select at least one of the transaction-processing resources of the system to process the transaction, the selection being made irrespective of whether the at least one resource is presently available and free to process the transaction or is presently busy with other work;
   identifying one of (a) the determined required attributes and (b) the selected at least one resource, in the workpacket;
   in response to an individual transaction-processing resource being available and free to process a transaction, using predetermined objectives and information in the workpackets of the transactions that are waiting to be processed to individually select a waiting transaction for processing by the individual resource from among all waiting transactions whose workpackets either identify the individual resource or identify determined required attributes that are all possessed by the individual resource;
   sending the workpacket of the selected transaction to the individual resource for use of the information in the workpacket by the individual resource;
   requesting that the transaction pointed to by the sent workpacket be connected to an address of the individual resource provided in the request; and
   in response to the request, transferring the selected transaction for processing from the location where the selected transaction is parked to the address provided in the request.

22. The method of claim 21, wherein, when the selected transaction-processing resource does not elect to process the transaction, the requesting step is not performed.

23. The method of claim 21 wherein the required attributes of the resource include a skill level and wherein the using step comprises:
   selecting the resource by determining that the selected resource has an adequate skills level among a set of resources in the plurality of resources.

24. The method of claim 21 wherein the required attributes includes a description of at least one of an agent skills level, an optimal skills range, a qualified skills range, an agent identification, an agent telephony device address, and a recent customer transaction list and wherein the using step further comprises comparing a call properties set associated with the transaction against the description of at least one of an agent skills level, an optimal skills range, a qualified skills range, an agent identification, an agent telephony device address, and a recent customer transaction list for the resources set for the at least a portion of the resources.

25. The method of claim 21 wherein the required attributes includes an indication of prior contacts with callers, and wherein the using step includes comparing a call properties set associated with the transaction against the required attributes of the resource of at least a portion of the resources sets to select the resource having a prior contact indicated with a caller who initiated the transaction.

26. The method of claim 21, wherein:

the requesting step comprises the following substeps;

the individual resource using the information in the sent workpacket to determine, based upon predetermined objectives, whether it will or will not process the transaction pointed to by the sent workpacket; and in response to determining that it will process the transaction pointed to by the sent workpacket, the individual resource requesting the transaction pointed to by the sent workpacket.

27. The method of claim 21, wherein the using step is performed.

28. The method of claim 21, wherein the identifying step identifies the determined required attributes.

29. The method of claim 21, wherein the identifying step identifies the selected at least one resource.

* * * * *